United States Patent [19]

Shearer et al.

[11] Patent Number: 5,579,521
[45] Date of Patent: Nov. 26, 1996

[54] CONVERSION OF DATA AND OBJECTS ACROSS CLASSES IN AN OBJECT MANAGEMENT SYSTEM

[75] Inventors: Wanda N. Shearer, Dublin; Barbara Holden, Menlo Park, both of Calif.

[73] Assignee: Hewlett-Packard Company, Palo Alto, Calif.

[21] Appl. No.: 321,931

[22] Filed: Oct. 12, 1994

Related U.S. Application Data

[62] Division of Ser. No. 21,913, Feb. 24, 1993, Pat. No. 5,386,564.

[51] Int. Cl.$^6$ ...................................................... G06F 3/153
[52] U.S. Cl. .................... 395/680; 395/349; 364/DIG. 2; 364/927.63
[58] Field of Search .................................... 395/157, 159, 395/161, 650, 700

[56] References Cited

U.S. PATENT DOCUMENTS

| | | | |
|---|---|---|---|
| 4,953,080 | 8/1990 | Dysart et al. | 364/DIG. 1 |
| 5,079,695 | 1/1992 | Dysart et al. | 395/700 |
| 5,226,117 | 7/1993 | Miklos | 395/157 |
| 5,303,379 | 4/1994 | Khoyi et al. | 395/700 |
| 5,303,388 | 4/1994 | Kreitman et al. | 395/159 |

Primary Examiner—Thomas M. Heckler

[57] ABSTRACT

In response to a user pasting data within a clipboard to a desktop for an object management facility, a new object for the data is created. The data is placed within the new object, and an icon is displayed on the desktop for the new object. When the data is text, the new object is created to be of a type which contains text. When the data is bitmapped, the new object is created to be of a type which contains bitmaps. The data is placed in the clipboard, for example, in response to a Cut command or in response to a Copy command from an application process originally processing the data. The data can reformatted, for example, before exporting the data from the application process, before importing the data to the new object or after importing the data to the new object. Also, in response to a user selecting a first object and issuing a conversion command, classes of objects into which the first object may be converted are displayed to the user. Upon the user selecting a class of objects into which the first object is to be converting, the first object is converted into a new object of the selected class of objects. The new object is created, data from the first object is extracted and sent to the new object. The data may be converted to a format usable by the first object, by the new object or by the object management facility.

18 Claims, 18 Drawing Sheets

CONVERSION OF DATA AND OBJECTS ACROSS CLASSES IN AN OBJECT MANAGEMENT SYSTEM

This application is a division of co-pending Ser. No. 08/021,913, filed Feb. 24, 1993.

BACKGROUND

The present invention concerns the conversion of data and object across classes within an object management system. The present invention is an improvement of technology disclosed within U.S. Pat. No 4,953,080 issued on Aug. 28, 1990 to John A. Dysart et al., the subject matter of which is herein incorporated by reference.

In computer systems such as personal computers, there is a continual search to provide a user flexibility in using data. It is desirable to make data originated by one computer application available for use by other computer applications. When data is made available to another computer application, it is desirable to have the data in a format which allows for easy modification.

In the prior art applications import or export data in particular formats. However, currently available methods handle data in a manner which has only limited flexibility.

SUMMARY OF THE INVENTION

In accordance with the preferred embodiment of the present invention, a computer implemented method within an object management facility is presented. In response to a user pasting data within a clipboard to a desktop for the object management facility, a new object for the data is created. The data is placed within the new object, and an icon is displayed on the desktop for the new object. When the data is text, the new object is created to be of a type which contains text. When the data is bitmap, the new object is created to be of a type which contains bitmaps. The data is placed in the clipboard, for example, in response to a Cut command or in response to a Copy command from an application process originally processing the data. The data can be reformatted, for example, before exporting the data from the application process, before importing the data to the new object or after importing the data to the new object.

Also, in accordance with the preferred embodiment of the present invention, an alternate computer implemented method within an object management facility is presented. In response to a user selecting a first object and issuing a conversion command, classes of objects into which the first object may be converted are displayed to the user. Upon the user selecting a class of objects into which the first object is to be converting, the first object is converted into a new object of the selected class of objects. When the new object is created, data from the first object is extracted and sent to the new object. The data may be converted to a format usable by the new object. The conversion may be performed by the new object, by the first object or by the object management facility.

The present invention provides enhancements which increase the flexibility with which data may be utilized by applications. The preferred embodiment is implemented as part of the NewWave Object Management Facility available from Hewlett Packard Co., having a business address of 3000 Hanover Street, Palo Alto Calif. 94304. The NewWave Object Management Facility runs in conjunction with Microsoft Windows which is an operating system available from Microsoft Corporation, having a business address at 16011 NE 36th Way, Redmond, Wash. 98073-9717.

DESCRIPTION OF THE PREFERRED EMBODIMENT

Figure 1:
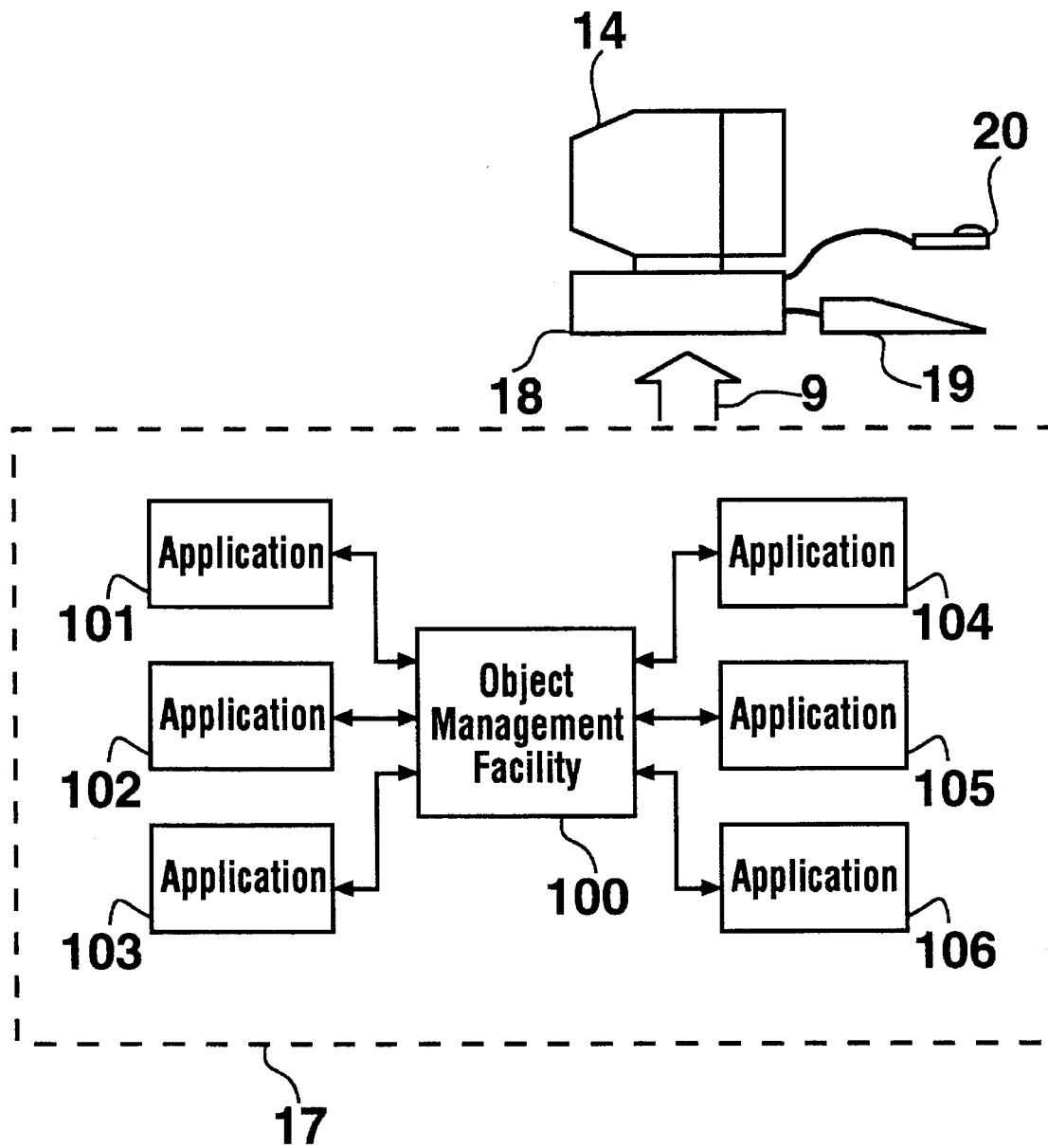
FIG. 1 is a block diagram of a computer in accordance with the preferred embodiment of the present invention.

FIG. 1 shows a computer 18 having a monitor 14, a keyboard 19 and a mouse 20. A portion of computer main memory 17 is shown by an arrow 9 to be within computer 18. Within computer memory main 17 is shown an object management facility (OMF) 100, an application 101, an application 102, an application 103, an application 104, an application 105 and an application 106.

Figure 2:
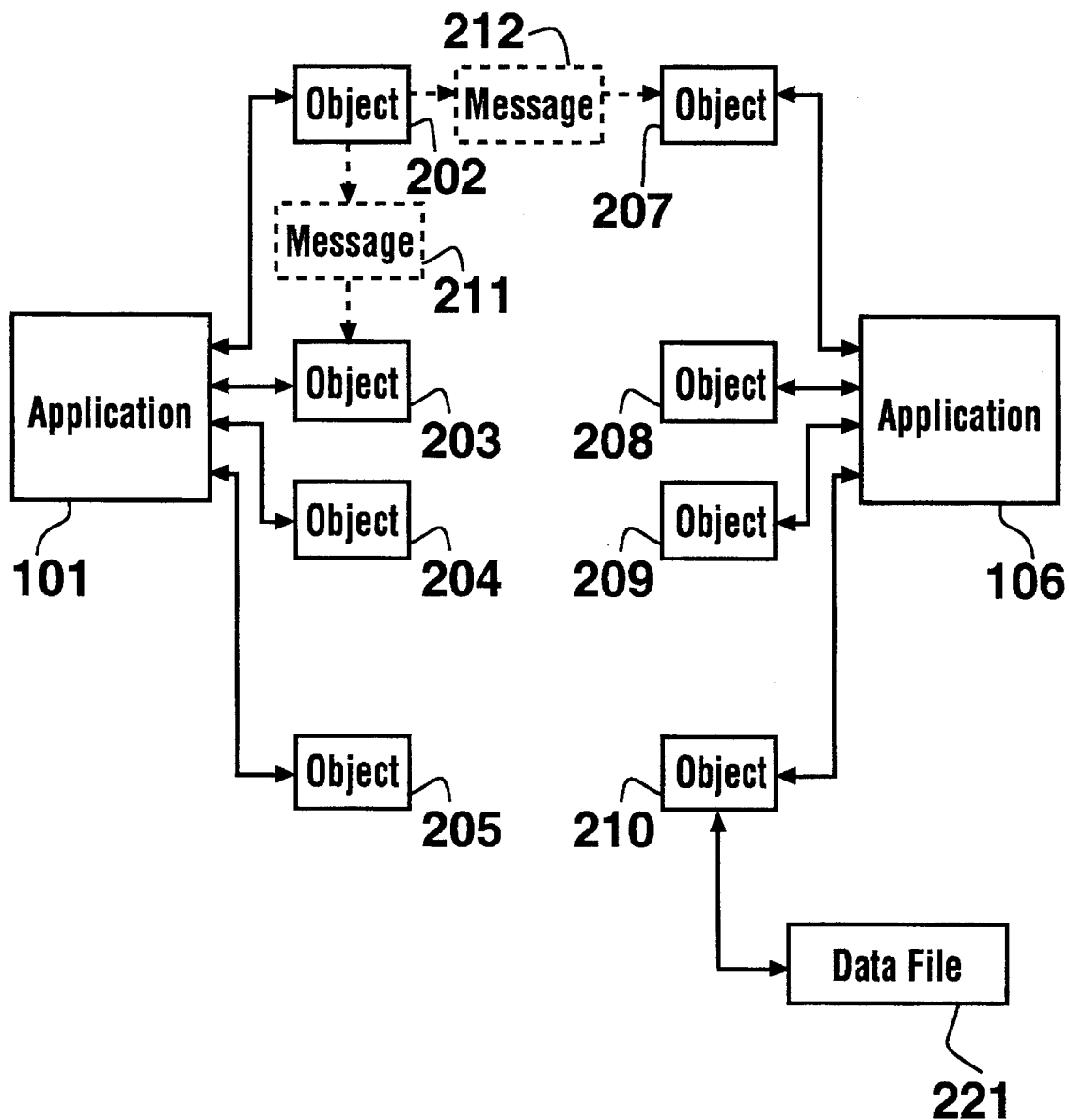
FIGS. 2 and 3 show block diagrams which illustrate the relationship between objects, applications and data files in accordance with the preferred embodiment of the, present invention.

Each of applications 101 to 106 store data using objects. For instance, in FIG. 2, application 101 is shown to have stored data using an object 202, an object 203, an object 204 and an object 205. Similarly, application 106 is shown to have stored data in an object 207, an object 208, an object 209 and an object 210. OMF 100 stores information indicating which objects go with which application. Objects which are associated with a single application are considered to be objects of the same type, or the same class. For instance, object 202, 203, 204 and 205 are of the same class because each is associated with application 101. Similarly objects 207, 208, 209 and 210 are of the same class because each is associated with application 106. All objects of the same class use the same application. When an application is being run by computer 18, OMF 100 informs the application which object's data the application should access. That object is then considered to be active. An object is inactive when the application the object is associated with is not being run by computer 18, or when the application the object is associated with is being run, but is not being run with the data of that object.

Active objects can communicate with each other using messages. For example if two instances of application 101 are being run by computer 18, one with the data of object 202 and the other with the data of object 203, object 202 and object 203 are both active. Therefore object 202 may send a message 211 to object 203. Similarly, if computer 18 is running application 101 with the data of object 202, and is running application 106 with the data of object 207, object 202 and object 207 are both active. Therefore, object 202 may send a message 212 to object 207.

Messages, such as message 211 and 212 may be formatted to be sent and received by all types of objects. This allows for free communication between all active objects. This also allows new object types to be defined and added to the system without requiting that the existing object types be updated to use the new type.

Each object has associated with it a data file. For instance, object 210 is shown to have associated with it a data file 221. Data in data file 221 are in a format which can be interpreted by application 106.

Figure 3:
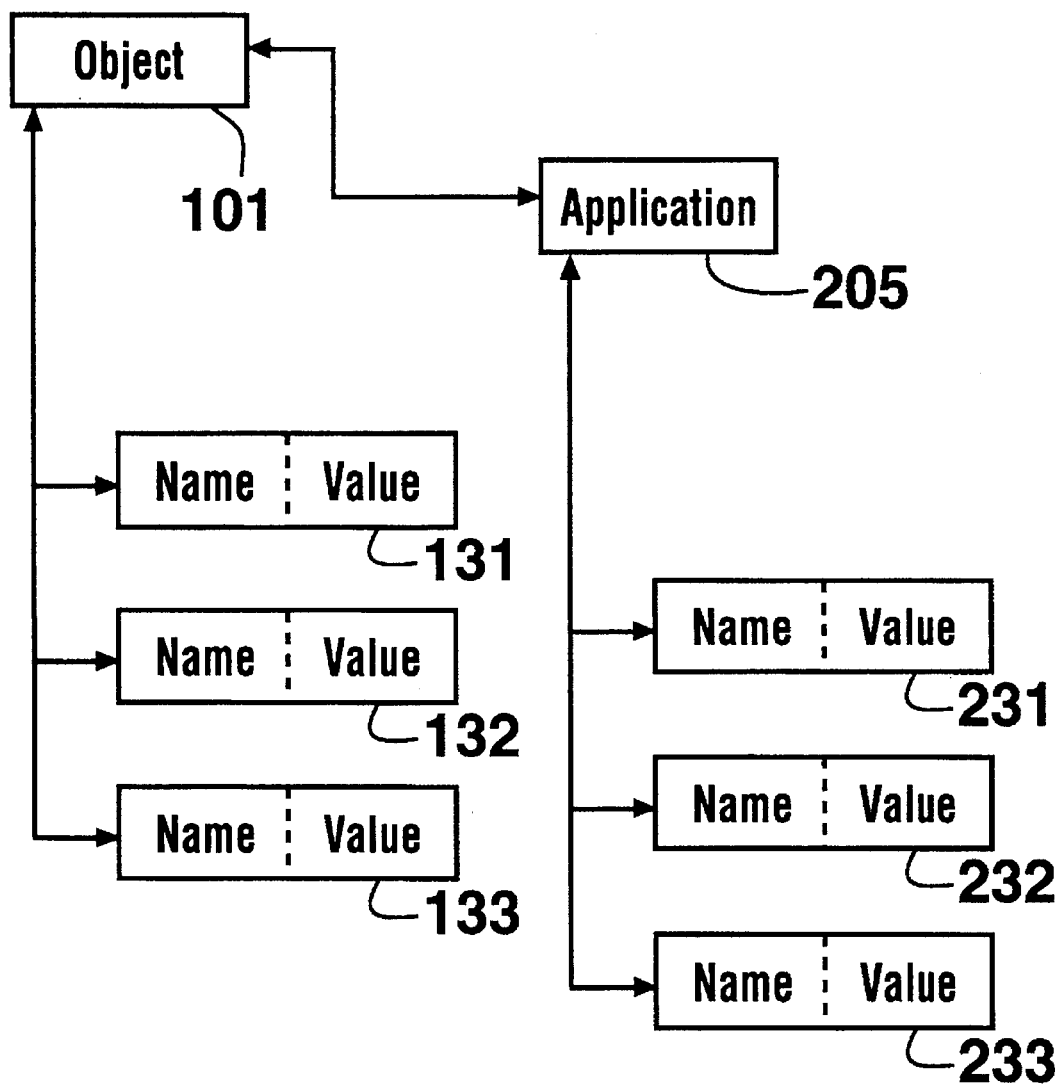

Each object has associated with it a list of properties. Each property has a name and a value which may be accessed by specifying the name. In addition, each class of objects has associated with it a list of properties that are common to all objects of that class. For instance, in FIG. 3, object 205 and application 101 are shown. Object 205 has associated with it a property 231, a property 232, and a property 233. Application 101 has associated with it a property 131, a property 132 and a property 133.

Property lists can contain any number of properties. Properties are used to store descriptive information about objects and classes, such as names, comments and so on.

Objects may have references to other objects. These references are called links. Links are directional: one object is called the parent, the other the child. Each link has a reference name which is a number that is assigned by the parent object to identify each of its children. All of an object's children, its children's children, and so on are collectively called that object's descendants. Similarly, an object's parents, its parents' parents, and so on, are collectively called that object's ancestors. In the preferred embodiment of the present invention, an object which may be manipulated by a user, can have zero or more children and one or more parents. An object is not allowed to become its own descendent.

Figure 4:
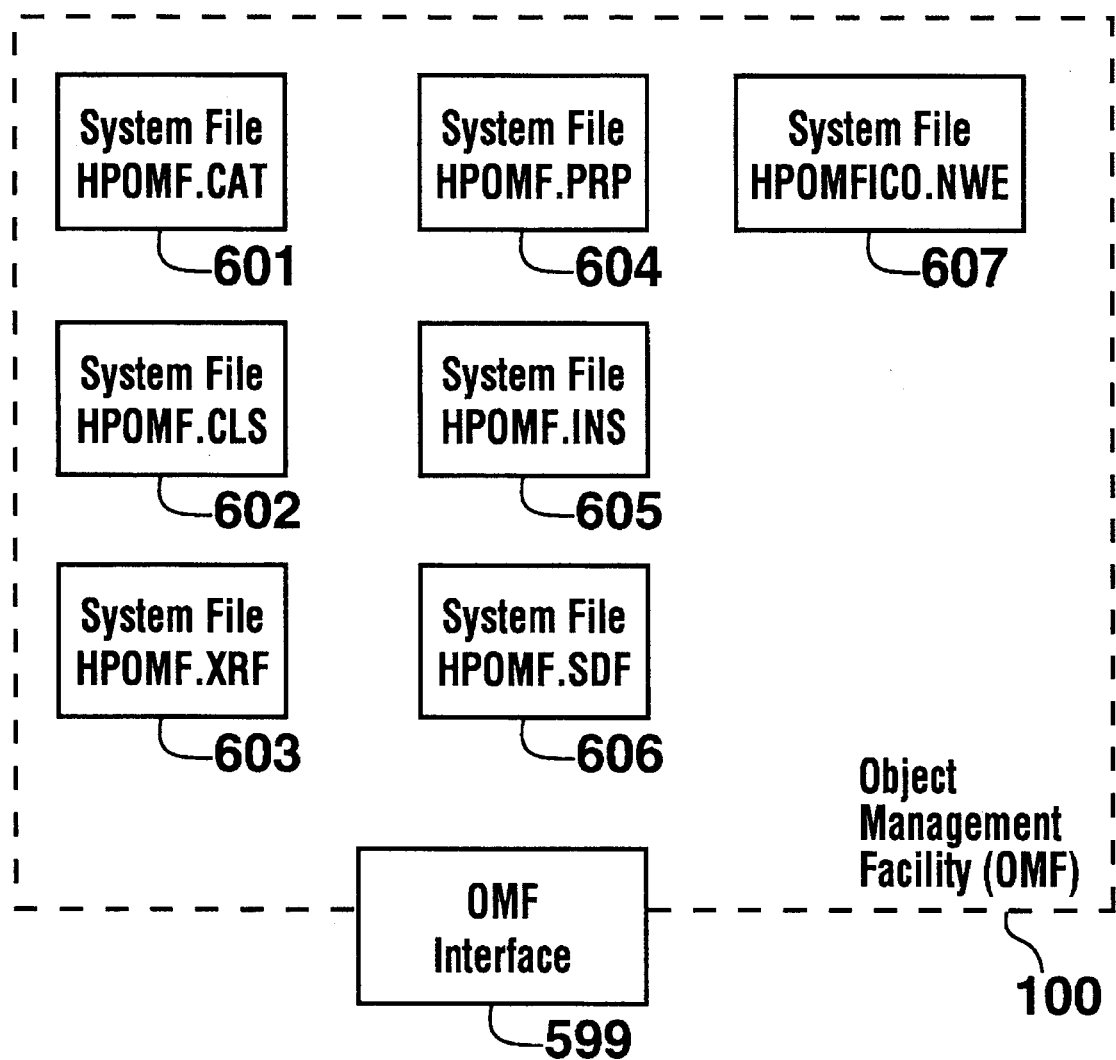
FIG. 4 is a block diagram of an Object Management Facility (OMF) in accordance with the preferred embodiment of the present invention.

In FIG. 4, OMF 100 is shown to contain seven system files: a system file 601, a system file 602, a system file 603, a system file 604, a system file 605, a system file 606 and a system file 607. An OMF interface 599 serves as interface of OMF 100 to other programs running on computer 18. System files 601–607 serve as a data base that provides various information. They provide information about object properties such as what class each object is what is the name of each object. System files 601–607 provide information about classes of objects such as what application is associated with each class of objects, what icon represents objects of a particular class and lists of what messages (such as those shown in FIG. 2) can be processed by objects of a particular class. System files 601–607 also contain information about links between parent and child objects including a list of parents and reference names of each link from a parent for each object; a list of children and reference names of each link to a child for each object; and additional information to manage data exchange across data links. Additionally, system files 601–607 contain general information such as what files are installed in the operating system for each class that is installed, and what objects have requested automatic restart when the OMF 100 is restarted.

In the preferred embodiment of the present invention system file 601 is referred to as HPOMF.CAT, system file 602 is referred to as HPOMF.CLS, system file 603 is referred to as HPOMF.XRF, system file 604 is referred to as HPOMF.PRP, system file 605 is referred to as HPOMF.INS, system file 606 is referred to as HPOMF.SDF and system file 607 is referred to as HPOMFICO.NWE. A description of each system file is now given.

System file 601, HPOMF.CAT, is also referred to as SYSCAT. HPOMF.CAT is a catalog of all the existing objects in the system. In FIG. 4, HPOMF.CAT is shown to be record oriented. HPOMF.CAT has a plurality of file records. In FIG. 4, file record 0 through file record 8 are shown, although HPOMF.CAT may contain many more file records than are shown in FIG. 4. File record 0 is a header which contains various signatures and is used to manage a list of free file records. A signature is some known value which if present indicates that the file is not corrupted. File record 1 through file record 8 and additional file records (not shown) either define an existing object, or are free. In the preferred embodiment HPOMF.CAT can grow dynamically, as more file records are needed, but cannot shrink.

File record 1 defines a special object called the global parent. The global parent has a form different than every other object, and may be regarded as a "pseudo" object.

In the preferred embodiment of the present invention, each record is 128 bytes in length. The fields for file record 0 are listed in Table 1 below:

TABLE 1

| | |
|---|---|
| lFirstFreeEntry | Contains the record number of the first free record in HPOMF.CAT, or "0" if there are no free records. |
| FileId | Contains the null terminated string "HPOMF.CAT". This serves as a signature. |
| Version | Contains the file format version number, which also serves as a signature. |
| lMaxRecordNumber | Contains the number of the highest record ever allocated from within HPOMF.CAT (this highest record may or may not be free). |

Table 2, below, contains the fields for file records in HPOMF.CAT for file records other than file record 0:

TABLE 2

| | |
|---|---|
| lFirstFreeEntry | Is "-1" if this record defines an object, otherwise this record is free and this field is the record number of the next free record, or "0" if there are no more free records. If the record is free, none of the other fields in the record is meaningful. |
| TypeInClass | Specifies the class of this object. This is the number of the record in HPOMF.CLS that indicates to which class the object belongs (see discussion of class above). |
| SysCatFlags | Specifies if the object is global if the bit masked by the number 20 (hexadecimal) is set in this byte. In the preferred embodiment all other bit positions must contain "0" and are not used. |
| properties | Specifies the number of properties, the length of property names and the location in HPOMF.PRP of the object's properties. See the description of HPOMF.PRP below for further definition of the structure of this field. |
| fastprops | Certain object properties, such as name, are so heavily accessed that they are stored directly in the field, rather than indirectly in the properties file. Properties stored in this field are called "fast properties." |

System file 602, HPOMF.CLS is also referred to as SYSCLASS. This system file is a list of all installed classes in the system. It is record oriented. The first record, numbered 0, is a header which contains various signatures (see above) and is used to manage a list of free records. All other records either define an installed class or are free. In the preferred embodiment HPOMF.CLS can grow dynamically, but cannot shrink.

Each file record in HPOMF.CLS is thirty-two bytes in length. HPOMF.CLS file record 0 (the header) contains the following fields listed in Table 3:

TABLE 3

| | |
|---|---|
| lFirstFreeEntry | Contains the record number of the first free record in HPOMF.CLS, or "0" if there are no free records. |
| FileId | Contains the null terminated string "HPOMF.CLS" |
| Version | Contains the file format version number. |
| lMaxRecordNumber | Contains the number of the highest record ever allocated from within HPOMF.CLS (this highest record may or may not be free). |

Table 4, below, contains the fields for file records in HPOMF.CLS for file records other than file record 0:

TABLE 4

| | |
|---|---|
| lFirstFreeEntry | Is "-1" if this record defines an installed class, otherwise this record is free and this field is the record number of the next free record, or "0" if there are no more free records. If the record is free, none of the other fields in the record is meaningful. |
| ModuleFileName | Specifies the name of the application associated with objects of this class as a null-terminated string. |
| properties | Specifies the number of properties, the length of the property names and the location in HPOMF.PRP of the object's properties. See the description of HPOMF.PRP below for further definition of the structure of this field. |

Figure 5:
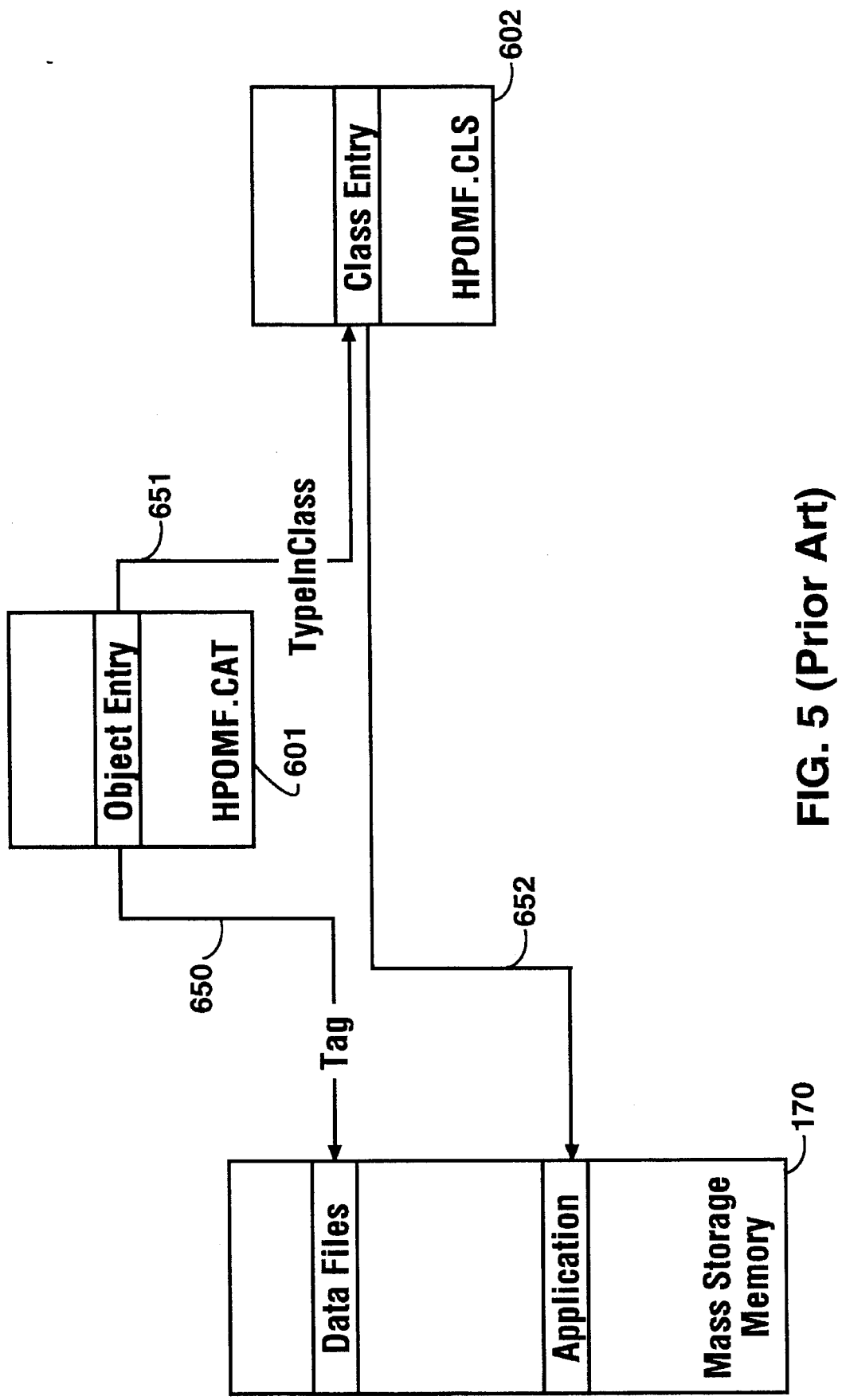
FIG. 5 is a block diagram which shows how system files within the OMF shown in FIG. 4 accesses data files and applications from memory shown in FIG. 1.

In FIG. 5, the relationship of HPOMF.CAT and HPOMF.CLS is shown. Within each object entry within HPOMF.CAT, the record number, which is an object's tag, serves as an identifier 650 of data files in a mass storage memory 170 associated with the object. The field "TypeInClass" serves as an identifier 65 1 of the class entry in HPOMF.CLS, which identifies the class of each object. Within each class entry in HPOMF.CLS, the field "ModuleFileName" serves as an identifier 652 of the application file in mass storage memory 170 which is associated with the class.

System file 603, HPOMF.XRF is also referred to as SYSXREF. This file is a list of all the links existing in the system. It is record oriented, but does not have a header record. Each record file is either free, or defines an existing link, or is used as an overflow record from the previous record to specify additional view specification information. Records that contain view specifications are called view specification file records. View specification file records can be identified only by a previous record which defines an existing data link; view specification file records cannot be identified by the content within a view specification file record. HPOMF.XRF is increased in size 16K bytes at a time. A newly allocated portion of HPOMF.XRF is filled with zeros. File records within HPOMF.XRF which are free or which define a link have the following fields listed in Table 5:

TABLE 5

| | |
|---|---|
| ParentTag | Contains the tag (HOPMF.CAT record number) of the parent object of this link. If this field is 0, then this record does not define a link and is free. |
| ChildTag | Contains the tag of the child object of this link. If ParentTag in this record is 0, and this field is also 0, then no record beyond this record is HPOMF.XRF defines a link. |
| RefName | Contains the reference name that the parent has assigned to the link. This field is meaningless if ParentTag or ChildTag is zero. Otherwise, if the top three bits of this value are 110, the next record in the file is a view specification. |

File records within HPOMF.XRF which are view specification file records have the following fields listed in Table 6:

TABLE 6

| | |
|---|---|
| DataId | Contains the value that the child has assigned to identify the part of itself that is being viewed through the link. |
| Snapshot | Contains the tag (HOPMF.CAT record number) of the object which is the view's snapshot, or if zero, the view has no snapshot. |
| Misc | Composed of several bit fields described below: |
| VS_NEWDATASET | Set if child has told OMF that new data is available, but has not been announced to the parent. The hexadecimal number 8000 0000 is a mask which indicates which bits are used for this bit field. |
| VS_NEWDATAANNOUNCED | Set if child has told OMF to announce new data to parent, but parent was inactive and was not notified. The hexadecimal number 4000 0000 is a mask which indicates which bits are used for this bit field. |
| VS_SNAPSHOTOLD | Set if child has told OMF that the view's snapshot is out-of-date. The hexadecimal number 2000 0000 is a mask which indicates which bits are used for this bit field. |
| VS_WANTMESSAGES | Set if child has told OMF that it wants to process view messages when snapshot is out-of-date. The hexadecimal number 1000 0000 is a mask which indicates which bits are used for this bit field. |
| VS_TEXTDISKLOC | File position in HPOMF.PRP where a view's 32 character textual data ID is located. This contains zero if no textual data ID has been defined by the child. The low order five bits of the file position are always zero and are thus not stored in the Misc field. The hexadecimal number 0FFF FFE0 is a mask which indicates which bits are used for this bit field. |
| VS_INTIALIZED | Set if the view specification |

TABLE 6-continued

| | |
|---|---|
| | has been initialized. If clear, all information in the view specification is zero. The hexadecimal number 0000 0010 is a mask which indicates which bits are used for this bit field. |
| VS_RESERVED | Reserved for future expansion. The hexadecimal number 0000 0008 is a mask which indicates which bits are used for this bit field. |
| VS_VIEWCLASS | Specifies the view class the child assigned to the view. The view class defines what view methods are available to the parent. The hexadecimal number 0000 0007 is a mask which indicates which bits are used for this bit field. |

System file 604, HPOMF.PRP, is also referred to as SYSPROP. HPOMF.PRP contains all the object and class properties except for the fast object properties which are contained in HPOMF.CAT. Each record in system file 601 (HPOMF.CAT) and system file 602 (HPOMF.CLS) has a properties field, as described above. Each properties field contains the fields described in Table 7 below:

TABLE 7

| | |
|---|---|
| DirDiskLoc | Contains the position (byte offset) within HPOMF.PRP of the property list directory. |
| nProps | Contains the number of properties in the property list. This is the number of entries in the directory entry array described below. |
| PoolSize | Contains the combined length of all the names of the properties in the property list, including a null-terminating byte for each name. This is the size of the directory name pool described below. |

For each object and for each class, at the DirDiskLoc position in the HPOMF.PRP file is the property directory for that object or that class. The directory has two major portions: the entry array, followed by the name pool. The entry array has one entry for each property in the property list. Each entry has fields set out in Table 8 below:

TABLE 8

| | |
|---|---|
| ValueLen | Specifies the length in bytes of the associated property. This can be zero. |
| ValueDiskLoc | Contains the position within HPOMF.PRP of the value of the associated property. If ValueLen is zero, this is also zero, and there is no value stored anywhere. |
| CacheOffset | This field is only used at run time and is not meaningful in the file. |

Immediately following the entry array is the name pool. This portion of HPOMF.PRP contains the null-terminated names of properties in the property list, in the same order as the entry array. Properties may include such things as titles, user comments, date and time of creation, the user who created the object, etc.

HPOMF.PRP grows dynamically as need. At the beginning of HPOMF.PRP there is a 128 byte bitmap which controls the allocation of the first 1024 pages of HPOMF.PRP. Each page is 32 bytes in length. These pages immediately follow the bit map. The bitmap is an array of words with the most significant bit of each word used first. Thus, bits 15 through 0 of the first word of the bitmap control the allocation of pages 0 through 15 of the file, respectively.

When storage in the first 1024 pages is insufficient, a second bitmap is added to the file following page 1023. This bitmap controls the allocation of pages 1024 through 2047, which immediately follow the second bitmap. Additional bitmaps and pages are added in the same way, as needed.

Each directory and property value is stored as a single block in the file, i.e., as a contiguous run of pages that are all allocated in the same bitmap. This causes the restriction that no directory or value can exceed 32K bytes (1024 times 32) in length.

System file 605, HPOMF.INS, is also referred to as SYSINSTL. HPOMF.INS contains a list of the files that were copied to the system when each class was installed. This information is used so that these files can be deleted when the class is de-installed.

The very beginning of HPOMF.INS is a double word value which serves as a validity/version identifier. In the preferred embodiment the value of this double word must be 0101ABCD hex to be valid. In Table 9, this number is stored as shown because of the protocols for storage in the particular processor used, i.e. an 80286 microprocessor made by Intel Corporation.

Following the double word comes a series of variable length records. There is one record for each installed class. The first word of each record is the length of the rest of the record, in bytes. This is followed by the null-terminated class name of the installed class. Then follows the file names of the files copied to the OMF directories, each terminated by a null byte, and preceded by a byte which gives the length of the file name, including the length byte and the null terminator. If the file name begins with the special character "*", the file is assumed to be located in the HPNWPROG directory. If the file name begins with the special character "+" the file is assumed to be located in the HPNWDATA directory.

For example, assume two classes are installed: class "AB" and class "CDE". Class "AB" caused two files to be installed: "Z" to HPNWPROG directory 668 and "YY" to the HPNWDATA directory. Class "CDE" caused 1 file to be installed: "XXX" to HPNWPROG directory 668. Given this case Table 9 below shows the contents of HPOMF.INS for this example:

TABLE 9

| off-set | content | comments |
|---|---|---|
| 0 | CD AB 01 01 | File header/version check |
| 4 | 0C 00 | Length of AB record (12 decimal) |
| 6 | 41 42 00 | "AB" + Null |
| 9 | 04 | Length of length byte "*Z" + Null |
| A | 2A 5A 00 | "*Z" + Null |
| D | 05 | Length of length byte + "+YY" + Null |
| E | 2B 59 59 00 | "+YY" + Null |
| 12 | 0A 00 | Length of CDE record (10 decimal) |
| 14 | 43 44 45 00 | "CDE" + Null |
| 18 | 06 | Length of length byte + "*XXX" + Null |
| 19 | 2A 58 58 58 00 | "*XXX" + Null |

System File 606, HPOMF.SDF is also referred to as the "shutdown file". HPOMF.SDF exists only when the system has been cleanly shut down. It is deleted as the system starts, and created as it shuts down. On startup, if this file is missing, OMF assumes that the last session ended abnormally, and so it goes through its crash recovery procedures to validate and repair the system files as best it can. The system files can be in an invalid but predictable state on a crash. These errors are corrected without user intervention. Certain other kinds of file consistency errors are detected, but are not really possible from an "ordinary" system crash. These errors are in general not correctable and the OMF will not allow the system to come up in this case.

If HPOMF.SDF is present, it contains a list of objects. When the system is being shut down normally, each object which is active at the time can request that the OMF restart them when the system is restarted. The list of objects, then is the list of tags of objects which have requested that they be restarted when the system is restarted.

The first word in HPOMF.SDF is a flag word. If this word is non-zero, OMF will execute its crash recovery code even though HPOMF.SDF exists. Normal shutdown will set this flag when producing the file if some serious error occurred in the session being ended.

After the first word, the rest of the file is a sequence of three byte records. The first two bytes of each record contain the tag of the object to be restored. The least significant byte is first. The third byte is not used in the preferred embodiment, and is zero.

For example, if the system is shut down cleanly in the last session and two objects, having tags of 2 and 7, respectively, have requested restart, the contents of HPOMF.SDF will be as set out in Table 10 below.

TABLE 10

| offset | content | comments |
| --- | --- | --- |
| 0 | 00 00 | Indicates no crash recover needed |
| 2 | 02 00 | Tag of first object to restart |
| 4 | 00 | Unused and reserved |
| 5 | 07 00 | Tag of second object to restart |
| 7 | 00 | Unused and reserved |

System file 7, HPOMFICO.NWE, is a Microsoft Windows dynamic library executable file which contains a dummy entry point and no data. Microsoft Windows is a program sold by Microsoft Corporation, having a business address at 16011 NE 36th Way, Redmond, Wash. 98073-9717. HPOMFICO.NWE also contains as "resources" the icons of each installed class. OMF modifies HPOMFICO.NWE directly during run time, and loads and unloads it to get the icon resources from it. The format of HPOMFICO.NWE is defined in Microsoft Windows documentation distributed by Microsoft Corporation.

Figure 6:
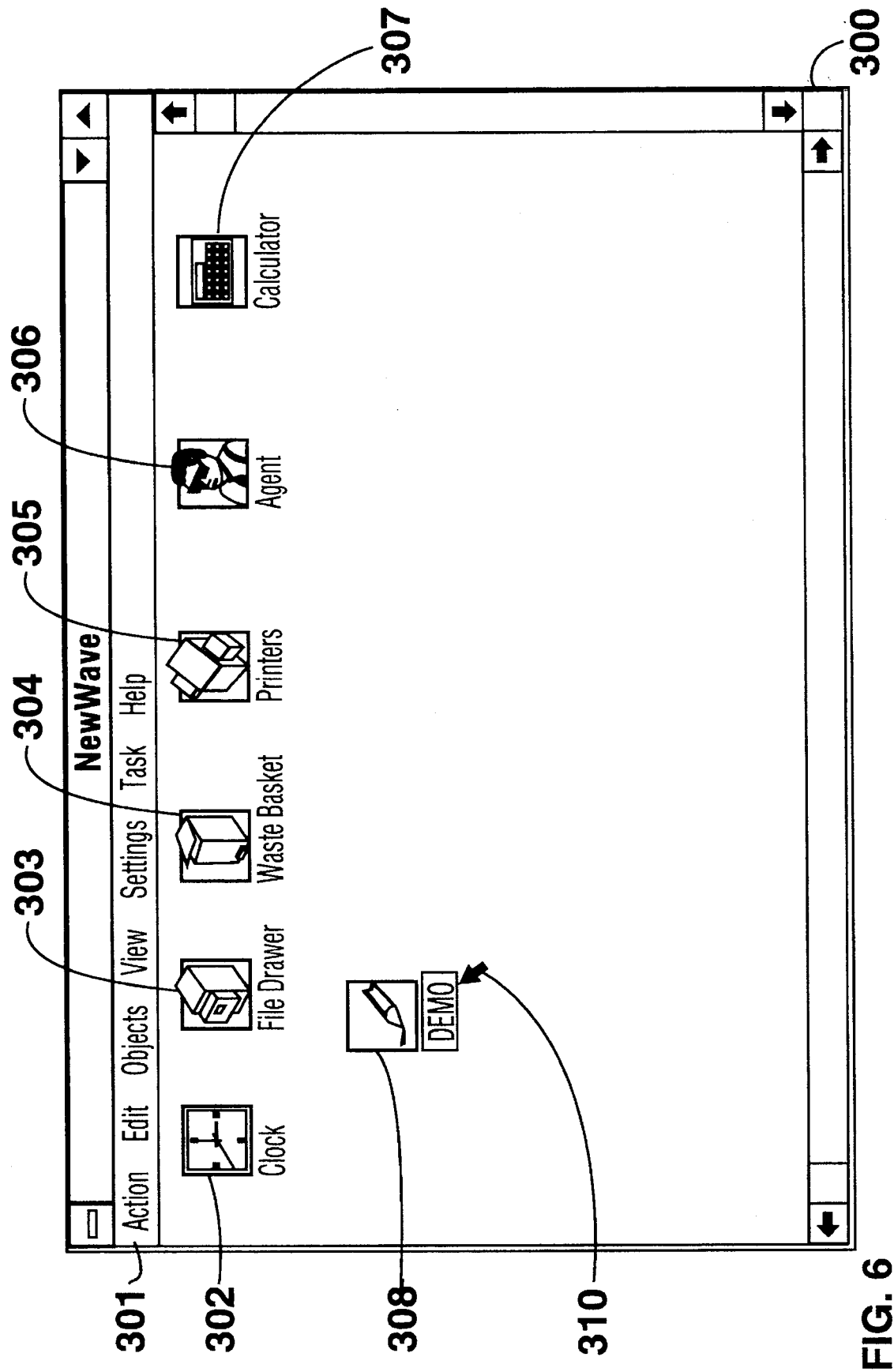
FIGS. 6, 7, 8, 9, 10, 11, 12, 13, 14, 15, and 16 show the appearance on a screen of a session in which a user creates objects and converts data in accordance with the preferred embodiment of the present invention.

FIG. 6 shows a screen displayed on monitor 14. A NewWave OMF window 300 has a menu bar 301. Within OMF window 300, icons are displayed which each represent an object. For example, an icon 302, an icon 303, an icon 304, an icon 305, an icon 306, an icon 307 and an icon 308 are shown. Icons 302 through 307 represent NewWave Tools.

Icon 308 represents an object DEMO associated with a word processing program. Object DEMO may be opened, for example, by using mouse 20 to place a cursor 310 over icon 308, and depressing a button on mouse 20 twice in quick succession.

Figure 7:
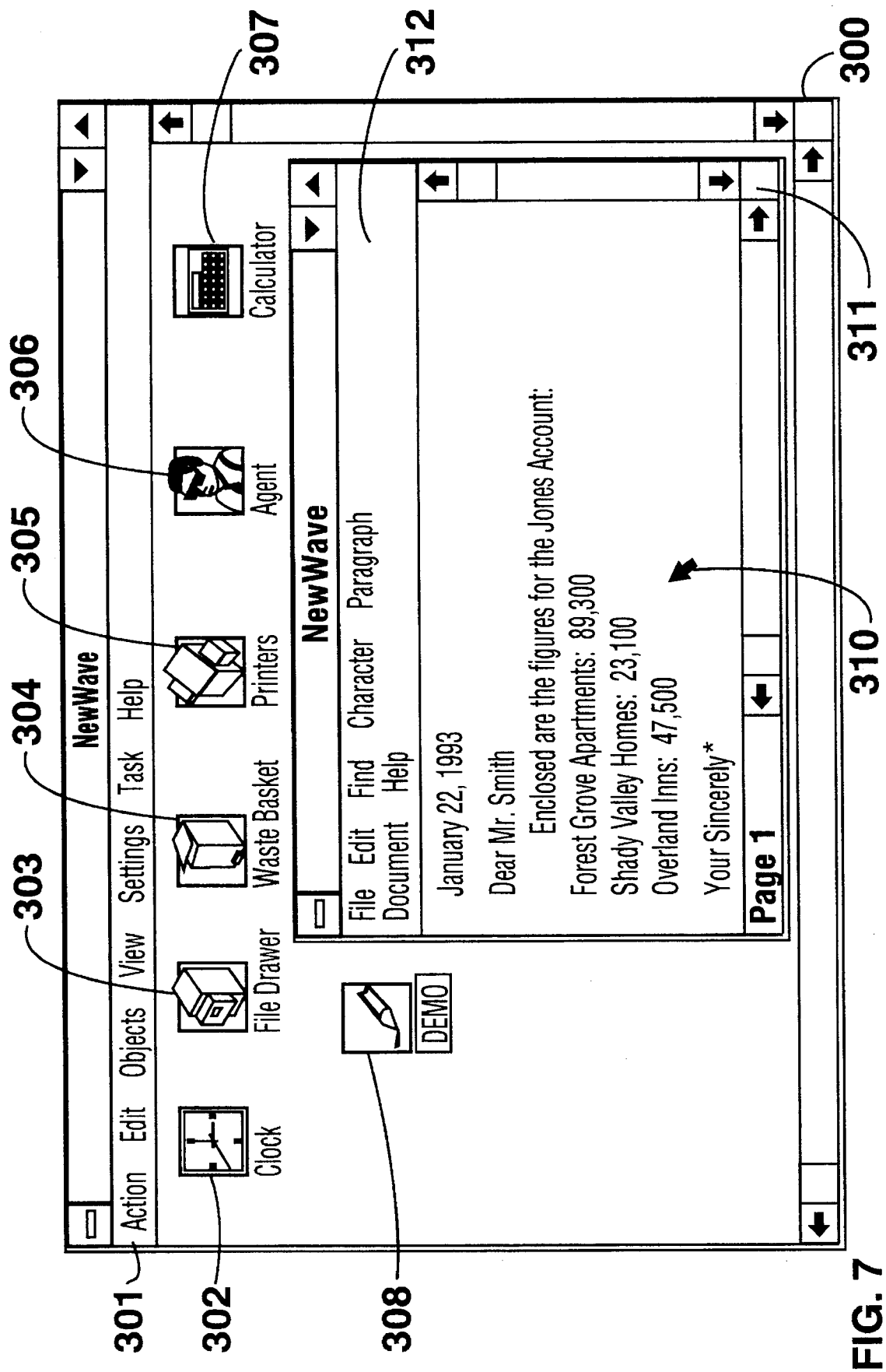
Figure 8:
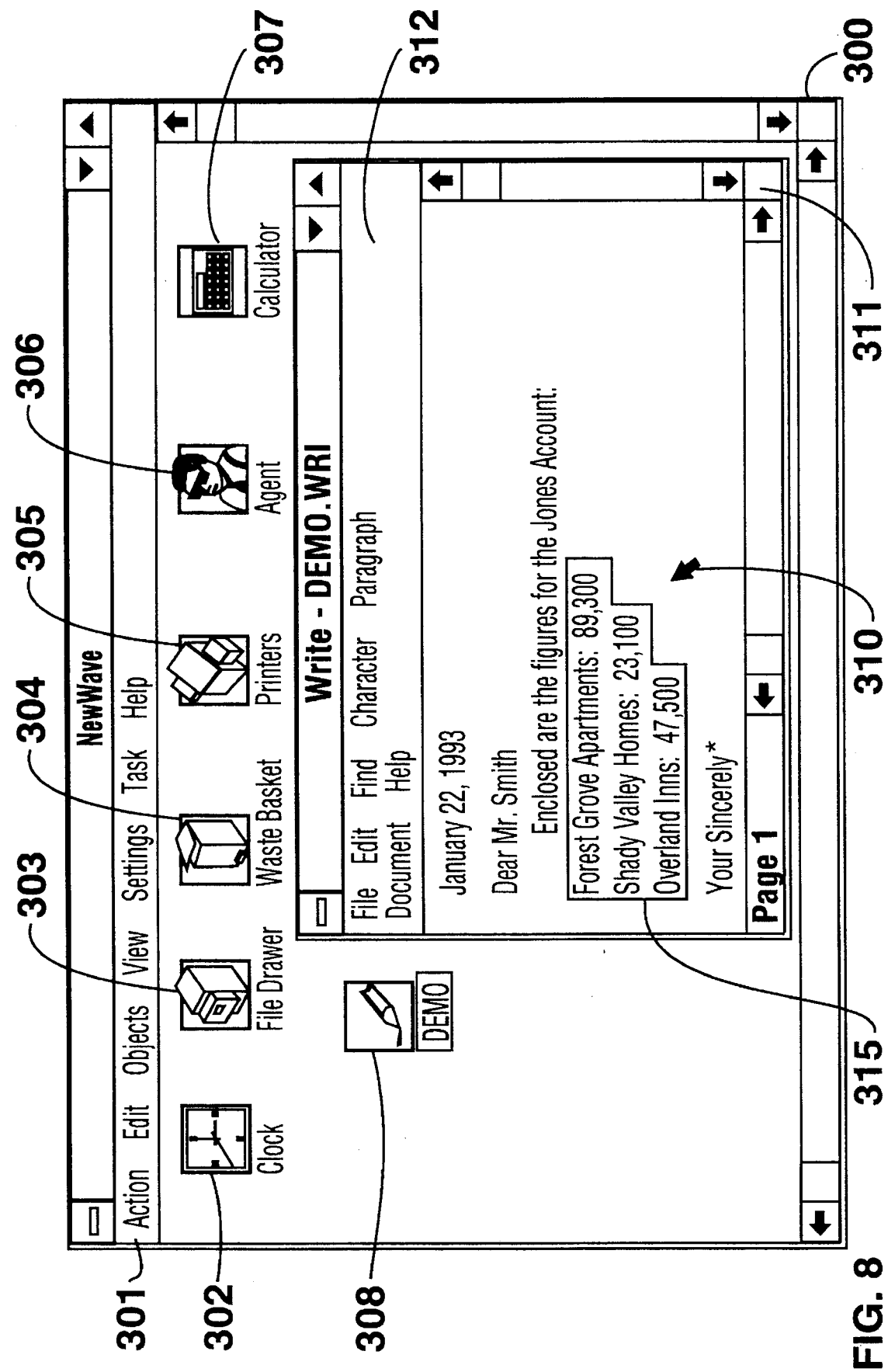
Figure 9:
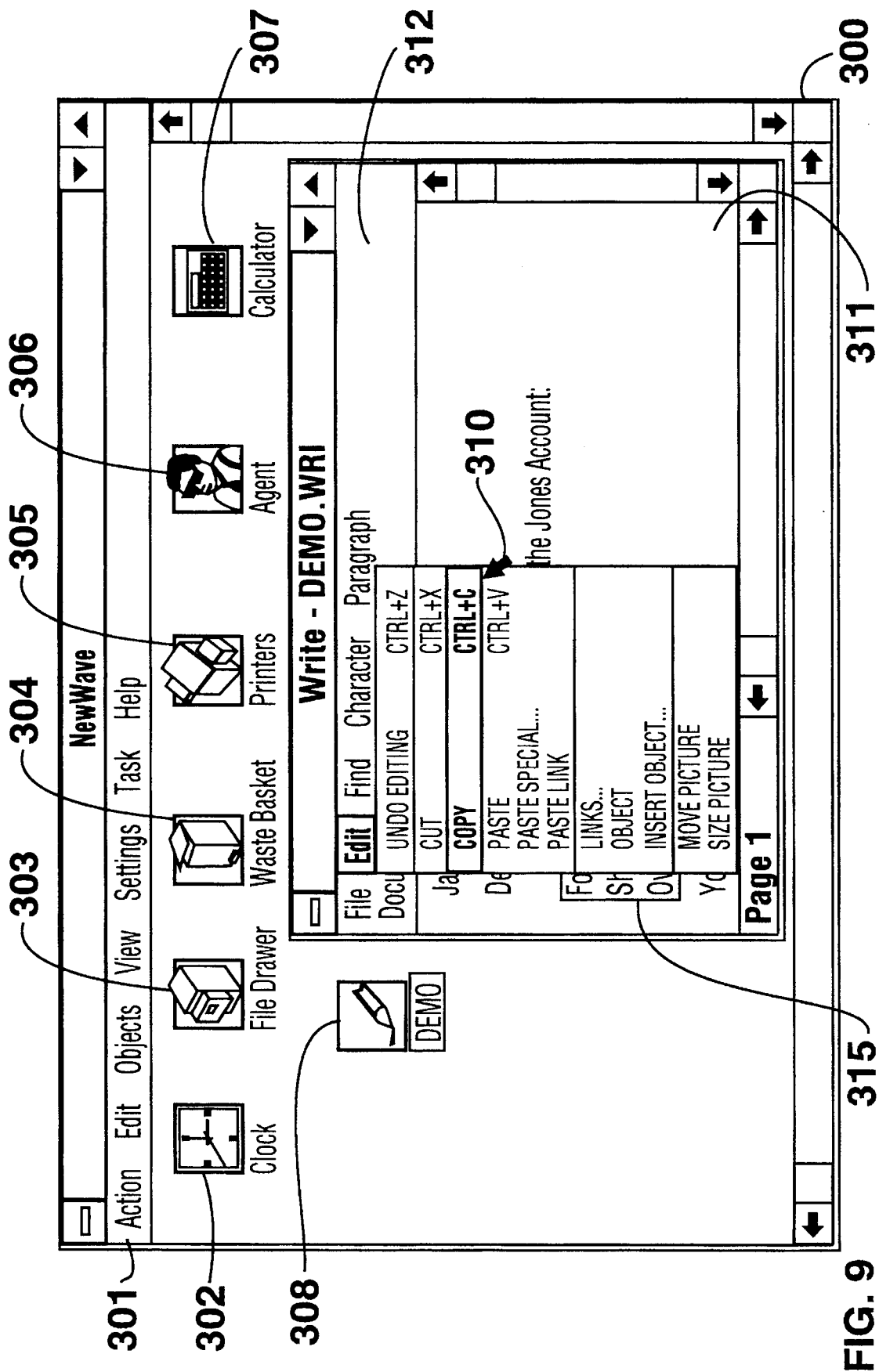
Figure 10:
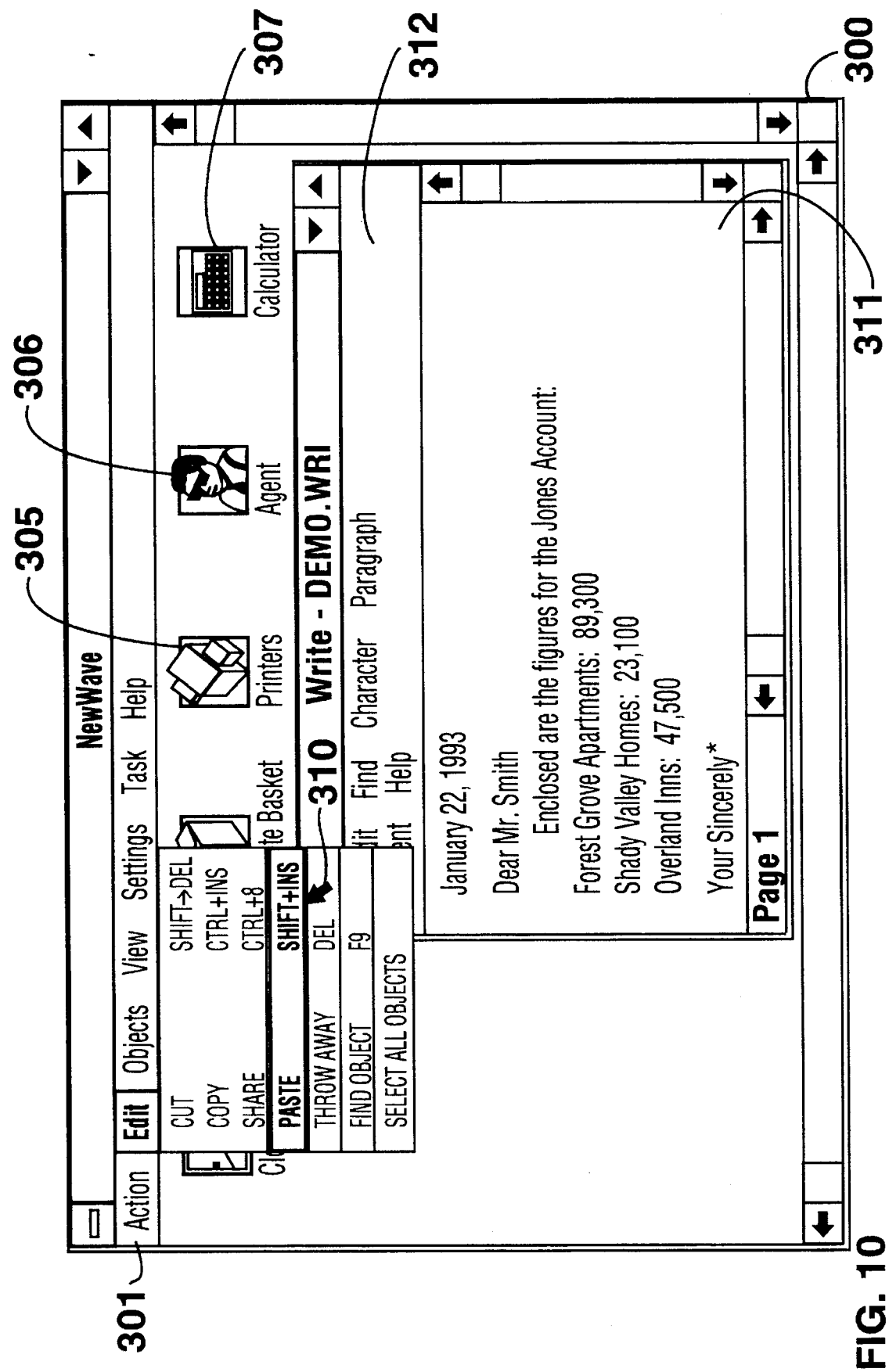
Figure 11:
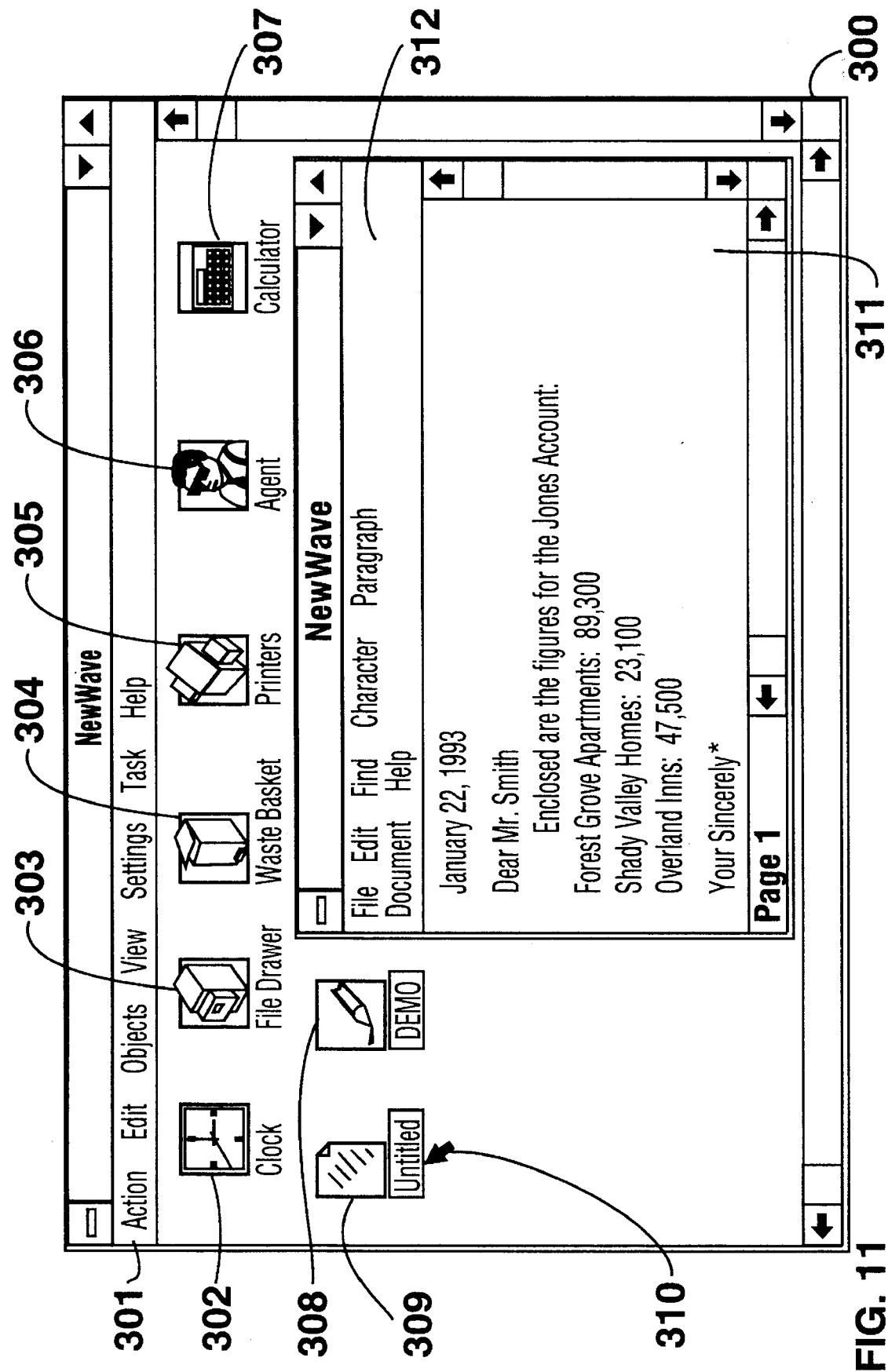

FIG. 7 shows an open window 311 for Object DEMO. Window 311 includes a menu bar 312. FIG. 8 shows the selection of text 315 within window 311. For example, text 315 is selected using cursor 310 and mouse 20. FIG. 9 shows text 315 being copied to a clipboard using cursor 310 to select "Copy" from pull-down menu "Edit" on menu bar 312. FIG. 10 shows the contents of the clipboard being copied to OMF window 300 by selecting "Paste" from pull-down menu "Edit" on menu bar 301. FIG. 11 shows an icon 309 for an Untitled object appearing within OMF window 300.

Figure 12:
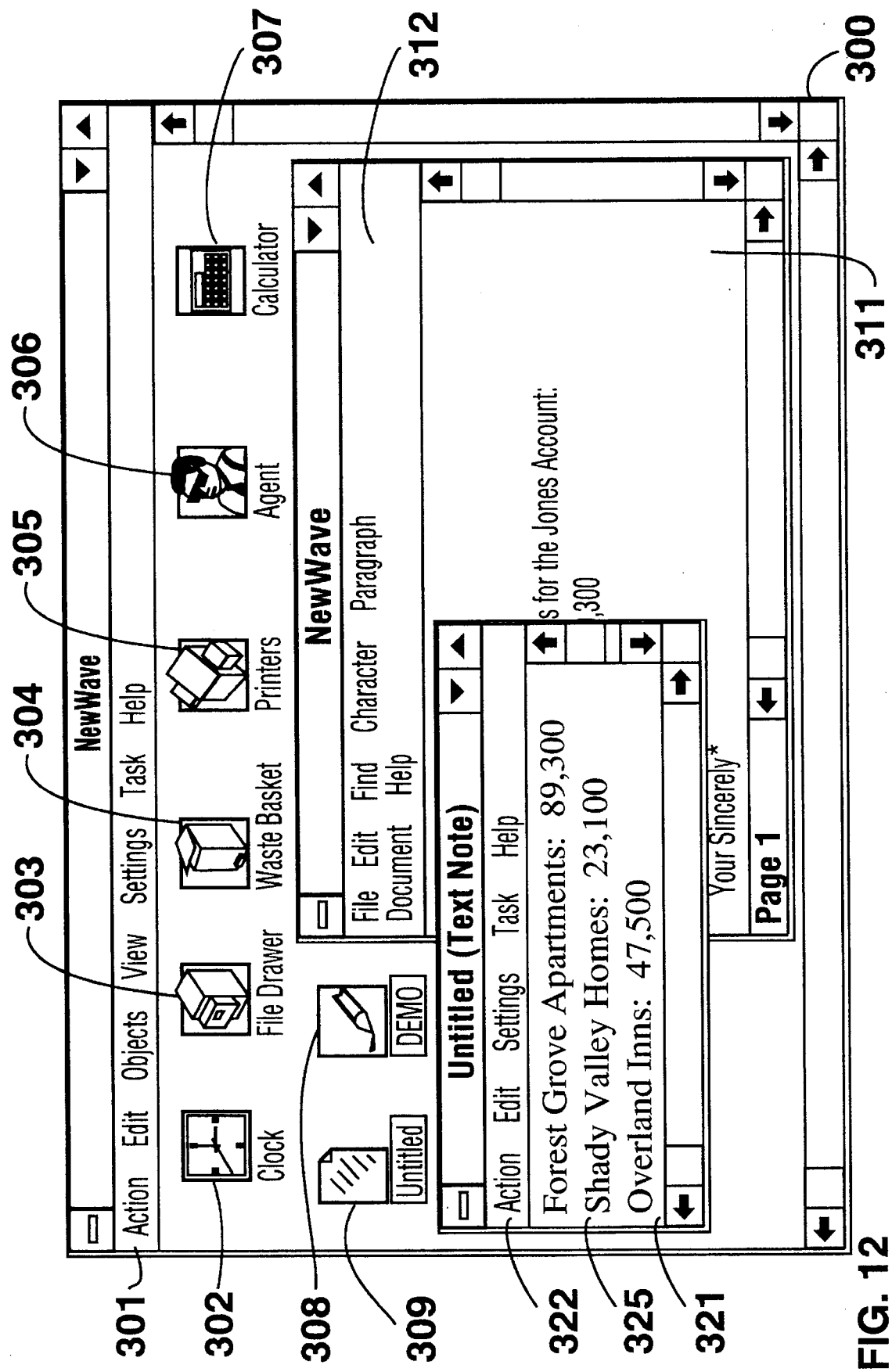

Object Untitled may be opened, for example, by using mouse 20 to place cursor 310 over icon 309, and depressing a button on mouse 20 twice in quick succession. FIG. 12 shows an open window 321 for Object Untitled. Window 321 includes a menu bar 322. Within 321, text 325 appears. Text 325 is identical to text 315.

The above discussion shows a user view of data to object conversion. The preferred embodiment of the present invention allows, upon request, the creation of an object from a bitmap or text to be turned into an object.

In order to implement the preferred embodiment of the present invention in an application, various modifications must be made to an application, particularly, two routines are added to an application program interface (API) for the application. These are NW_MakeClipboardFormat and NW_IsClipboardFormatAvailable. In addition, the APIs for applications which support the preferred embodiment of the present invention must be installed with the correct conversion information in one or more of the following properties: PROP_CLASS_DATA_FMT, PROP_ACCEPT_DATA_FMTS and PROP_RENDER_DATA_FMTS. These properties are stored in the installation, or IN$ file for the class, as described in more detail below.

For an object to be converted to data, the object must either have a native data file format of TEXT or support the RENDER_DATA method (see below) for the desired data format. For data to be converted to an object, the (new) object must either have a native data file format of TEXT, and TEXT has to be on the clipboard, or the (new) object must support the ACCEPT_DATA method (see below) for one of the formats on the clipboard.

When there is data on the clipboard and a user requests a paste of data to be made to OMF window 300, the routine NW_MakeClipboardFormat is called with a desired format of CFN_OBJECT. NW_IsClipboardFormatAvailable can be called to find out if CFN_OBJECT is available. The new object will be made according to the following rules, in priority order. First, if the data on the clipboard was put there by an NewWave OMF object (native or encapsulated), and the object is active, then the object created will be the same class, if possible (i.e., if the class supports the necessary methods and properties).

If the object cannot be created with the same class, the class of the object will depend on the format of data on the clipboard. If the data on the clipboard is text, a Textnote object will be constructed. If the data on the clipboard is not text, then all the classes will be searched for an appropriate object class which supports the particular data format via the ACCEPT_DATA method.

When a match is found, then the routine will stop looking at the formats on the clipboard. The enumeration tries to ensure that the richest format possible is used, since normally applications put their richest format first on the clipboard.

The following Table 11 is a description of the total algorithm which converts data from an application to the OMF desktop window 300, or for an application that supports PASTE:

TABLE 11

1. The user issues a Cut or Copy command from a NW object or an MSWindows application. The selection can be either object or date.
2. The destination gets ready to display the Edit menu. It wants either the CFN_OBJECT format, or data of a certain format. It asks the OMF, via the NW_IsClipboardFormatAvailable routine, if the format is available. (It does this so it knows whether or not to gray the Paste item on the Edit menu.)
3. The NW_IsClipboardFormatAvailable routine first looks to see if there is anything on the MSClipboard. If not, Fail is returned. If the requested format is already on the MSClipboard, it returns Success. If not, then it decides whether or not it can provide that format from the current Clipboard contents.
4A. If the requested format is data AND there is an object on the Clipboard, it gets the class of that object. It then looks at the class properties of the object to see if it can export data of the type requested, or, if TEXT is requested, if its native data file format is TEXT. If so, Success is returned, else Fail. If there is no object on the clipboard, Fail is returned.
4B. If an object is requested, AND there is data on the MSClipboard, then the routine follows the Object Conversion algorithm given on the preceding page to see if an object could be constructed from the formats on the clipboard. If so, Success is returned, else Fail. If there is already an object on the clipboard, Success is returned.
5. If the destination is directed to Paste by activation of the Edit menu or by a shift-insert, it then asks NW to make the requested format via a new routine, NW_MakeClipboardFormat.
6. This second routine first looks to see if the requested format is already available. If an object is requested, it also verifies that the object supports the requested methods. If the format is available, it returns without doing anything.
7A. If data is requested, and there is an object on the clipboard, then if the object's native data file format is the same as the format requested, and the format requested is TEXT, the data file is read and put on the clipboard. If not, then the routine looks to see if the object can export data of the format requested via the Render Data method. If so, then the object is sent the Render Data message.
7B. If an object is requested, a class is searched for. If the desired class's native data file format can be TEXT, and TEXT is available on the clipboard, then a new object is constructed by creating a data file from the clipboard data. Else, the new object will be sent the Accept Data message, and then put on the clipboard. Basic properties (TITLE, CREATOR, CREATION DATE, and comments) are written for the new object.
8. Upon a successful return, the application can pull the requested format off the MSWindows Clipboard.

The NW_IsClipboardFormatAvailable routine is used to ask the OMF if it can derive data in the requested format from the contents of the MSWindows clipboard. The NW_IsClipboardFormatAvailable routine is specified as follows:

NW_IsClipboardFormatAvailable (hOMF, hWnd, wFormat):nStatus

The parameters for the NW_IsClipboardFormatAvailable routine are set out in Table 12 below:

TABLE 12

| | |
|---|---|
| hOMF | the handle returned to this object by the OMF_Init function |
| hWnd | the caller's window handle |
| wFormat | the data format desired by the pasting object. Both public and private formats are allowed, as well as CFN_OBJECT. |

The return value, nStatus, is a Boolean return. If True, a subsequent call to NW_MakeClipboardFormat will ensure that the desired format is available on the clipboard. If False, the format is unavailable.

NW_IsClipboardFormatAvailable will open and close the MSWindows clipboard. If the clipboard is already open, the routine will return FALSE regardless of the contents of the clipboard.

The NW_MakeClipboardFormat routine tells the OMF to ensure that the desired format is on the MSWindows clipboard. If the format is CFN_OBJECT, the methods it needs to support may be specified as an option. The NW_MakeClipboardFormat routine is specified as follows:

NW_MakeClipboardFormat (hOMF, hWnd, wFormat, hMem, nMethods): nStatus

The parameters for the NW_MakeClipboardFormat routine are set out in Table 13 below:

TABLE 13

| | |
|---|---|
| hOMF | the handle returned to this object by the OMF_Init function |
| hWnd | the caller's window handle |
| wFormat | the data format desired by the pasting object. Both public and private formats are allowed, as well as CFN_OBJECT |
| hMem | a global memory handle to an array of words. This memory should have the same format as the memory parameter defined under Create A New, minus the first two words.<br>This format specifies a Boolean expression of the form:<br>Method AND Method AND Method . . .<br>OR Method AND Method AND Method . . .<br>OR . . .<br>The "AND"s are implicit between adjacent words. The "OR"s are represented by a word with the value of -1. A NULL value means the calling application doesn't want the routine to check any methods. |
| nMethods | the length of the hMem memory, or the total number of methods PLUS the total number of -1 words. If hMem is NULL, this parameter is ignored. |

The return value, nStatus, is an integer value which, if zero, signifies that the requested format is on the clipboard. A non-zero status return indicates an error. The error returns are defined in the file nwutil.h, and are as set out in Table 14 below:

TABLE 14

| | |
|---|---|
| DATAO_CLIPBOARD_ERR | This error means that either the MS Clipboard was empty, OR that it was not opened by the application. |
| DATAO_NO_FMT_SUPPORT | This return means that the format of the data on the MSClipboard was not one supported by any class currently installed. |
| DATAO_NO_METHOD_SUPPORT | This return means that the methods requested were not supported by any class that could support the clipboard format. |
| DATAO_MEMORY_ERR | This means that a call, such as GlobalAlloc, to get memory storage, failed. |
| DATAO_DATAFILE_ERR | This means that the data file of the object on the clipboard could not be opened. |

TABLE 14-continued

| | |
|---|---|
| DATAO_MSG_ERROR | This is returned when a call to RenderData or AcceptData fails for some reason other than on OMF error (i.e., the object being sent the message returned an error). |
| DATAO_SYNTAX_ERROR | This is returned when the parameters to a call are not syntactically correct. |

If the error return is not listed in Table 14 above, the error return is an OMF error return. That is, the routine returns the result of OMF_GetOMFError.

The application calling NW_MakeClipboardFormat must open the MSWindows clipboard before calling NW_MakeClipboardFormate NW_MakeClipboardFormat routine assumes that this is the case. If the clipboard is not open, NW_MakeClipboardFormat will return DATAO_CLIPBOARD_ERR. NW_MakeClipboardFormat will not delete the contents of the MSWindows clipboard, as what is being added to the clipboard is just another format for the data or object that was previously there.

Compatible class syntax error handling is performed as follows. If a syntax error is encountered in one of the compatible classes property strings (such as CLASS_DATA_FMT), the remainder of the classes will be queried for support of the property. If no other class is found that supports the property (without IN$ syntax errors) then DATAO_SYNTAX_ERR will be returned by NW_MakeClipboardFormat. Otherwise the format will be made and the previous syntax error will be ignored.

In the preferred embodiment, the user SHARE command is not supported by NW_MakeClipboardFormat. This is because if the desired format is some sort of data, even if the object on the clipboard is a SHARE object, the application performing the paste will still paste data from the object, not the object itself. If the desired format is an object, there is no way for the user to tell the application performing the paste that a SHARE not a COPY is desired, since the SHARE syntax applies to the source, and the source pasted data.

Table 15 below shows an example of a routine which calls NW_IsClipboardFormatAvailable:

TABLE 15

```
void PASCAL SetRectangle(prcRect)
PRECT prcRect;
{
    grcNewRectangle = *prcRect;
    NoSelection();
    if (NewRectangle) {
        /* see if there is anything on the clipboard to paste */
        if (NW_IsClipboardFormatAvailable(ghOMF, ghWnd,
            RegisterClipboardFormat(CFN_OBJECT))) {
                APIEnableMenuItem(ghAPI, ghMenu,
                IDDPASTE, API_ENABLE_MENU,
                API_NO_MODE);
        }
        APIEnableMenuItem(ghAPI, ghMenu, IDDCREATE,
            API_ENABLE_MENU, API_NO_MODE);
    }
} /* EndSetRectangle */
```

Table 16 below shows an example of a routine which calls NW_MakeClipboardFormat:

TABLE 16

```
case API PAST CDCMD:
    /* Note: code omitted here for clarity */
    if(!OpenClipboard(hWnd)) {
        NoteError(ERR_CLIPBOARD);
        intCmd->wCmd - API_NO_CMD;
        break;
    }
    /* Is there an object on the clipboard */
    wFormat = RegisterClipboardFormat(CFN_OBJECT);
    if(wFormat != O) {
        if(!IsClipboardFormatAvailable(wFormat)) {
            /* Try to Make the Object */
            /* set up array of methods needed by desired object */
            HANDLE hMem;
            WORD FAR *lpMem;
            hMem = GlobalAlloc( GMEM_LOWER | GMEM
                MOVEABLE |GMEM ZEROINIT,
                (DWORD(sizeof(WORD_ * 2));
            lpMem = (WORD FAR*GlobalLock(hMem);
            /* Note: these methods are only typical and will
            vary from application to application. */
            lpMem[0] = INIT_VIEW;
            lpMem[1] = DISPLAY_VIEW |
                VIEWMETHODFLAG;
            GlobalUnlock(hMem);
            if (NW_MakeClipboardFormat(ghOMF,hWnd,
                wFormat,hMem,2)!= 0){
                    ErrorMsg(IDS_NOCLIPOBJ);
                    intCmd->wCmd = API_NO_CMD;
                    CloseClipboard( );
                    GlobalFree(hMem);
                    break;
            }
        }
        GlobalFree(hMem);
    }
    /* Get the object from clipboard ... */
```

Also, the preferred embodiment of the present invention allows an object to be converted to another compatible object. This functionality enhances work group activities. Compatible class support is provided via a 'Convert to Compatible Object' command at the Desktop. When the command is selected, the system is searched for any compatible classes, i.e., classes that support a given data format.

When an uninstalled object is opened, the OMF displays a message for the user. For a non-installed object class the message is: "Classname" has not been installed in New-Wave. A user may then either install the application, or use the 'Convert to Compatible Object . . . ' command. For a de-installed object the message is: "Classname" has been deinstalled from NewWave. A user may then either install the application, or use the 'Convert to Compatible Object . . . ' command.

Figure 13:
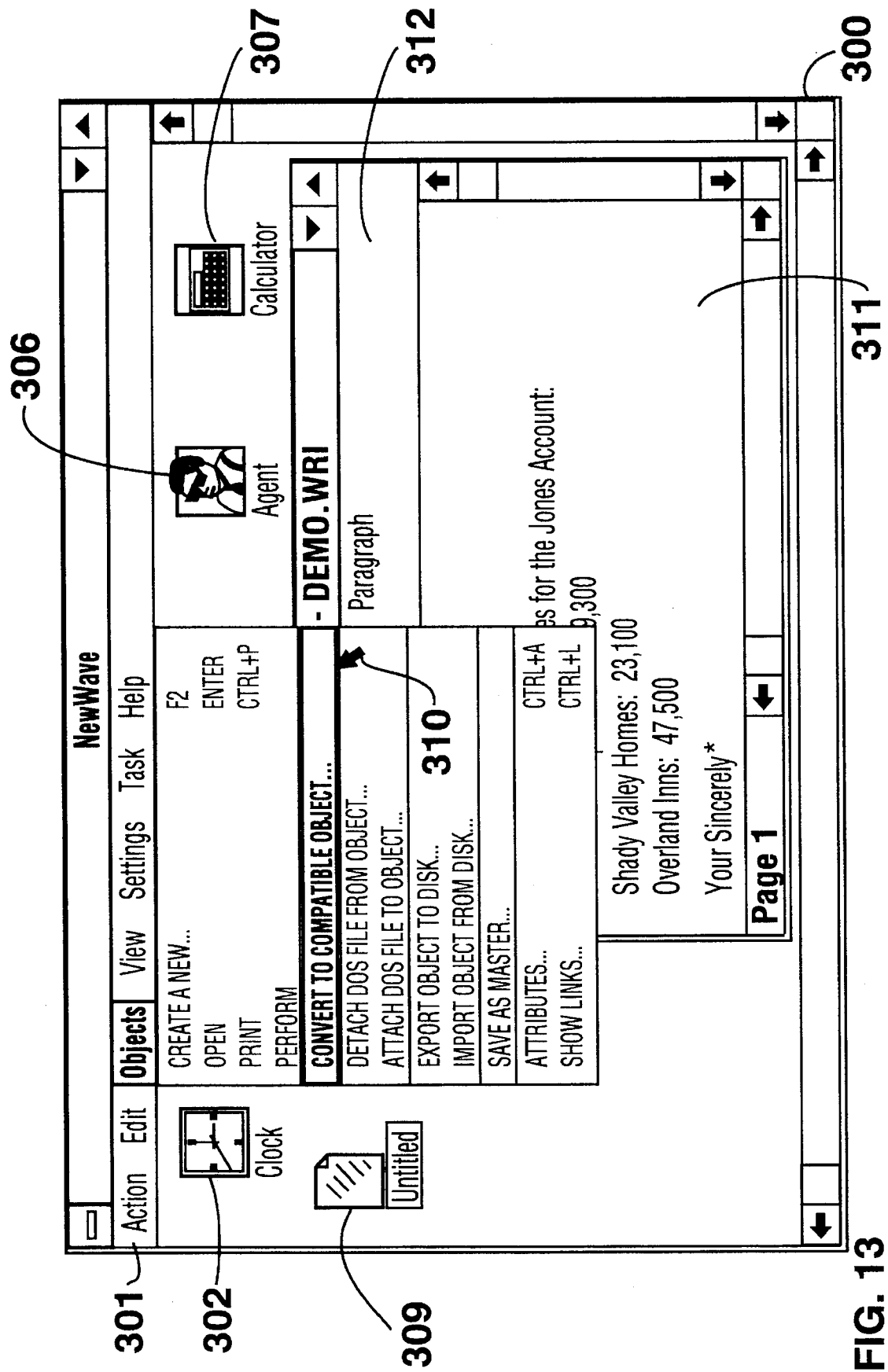

In FIG. 13, window 321 has been closed. Also, the Text object "Untitled" has been selected, for example, by using mouse 20 to place cursor 310 over icon 309 and depressing a mouse button. FIG. 13 shows cursor 310 being used to select the 'Convert to Compatible Object . . . ' command from pull down menu "Objects" on menu bar 301. This command operates upon the selected object at the time the command is selected. The selected object may be an uninstalled object. If more than one object is selected on the Desktop or in a folder, the 'Convert to Compatible Object . . . ' command will be greyed. While the Text object "Untitled" has recently been created via pasting data on the OMF Desktop, this is not in any way a prerequisite for the "Convert to Compatible Object . . . " command. Any object with data in a convertible format can be selected for the command.

Figure 14:
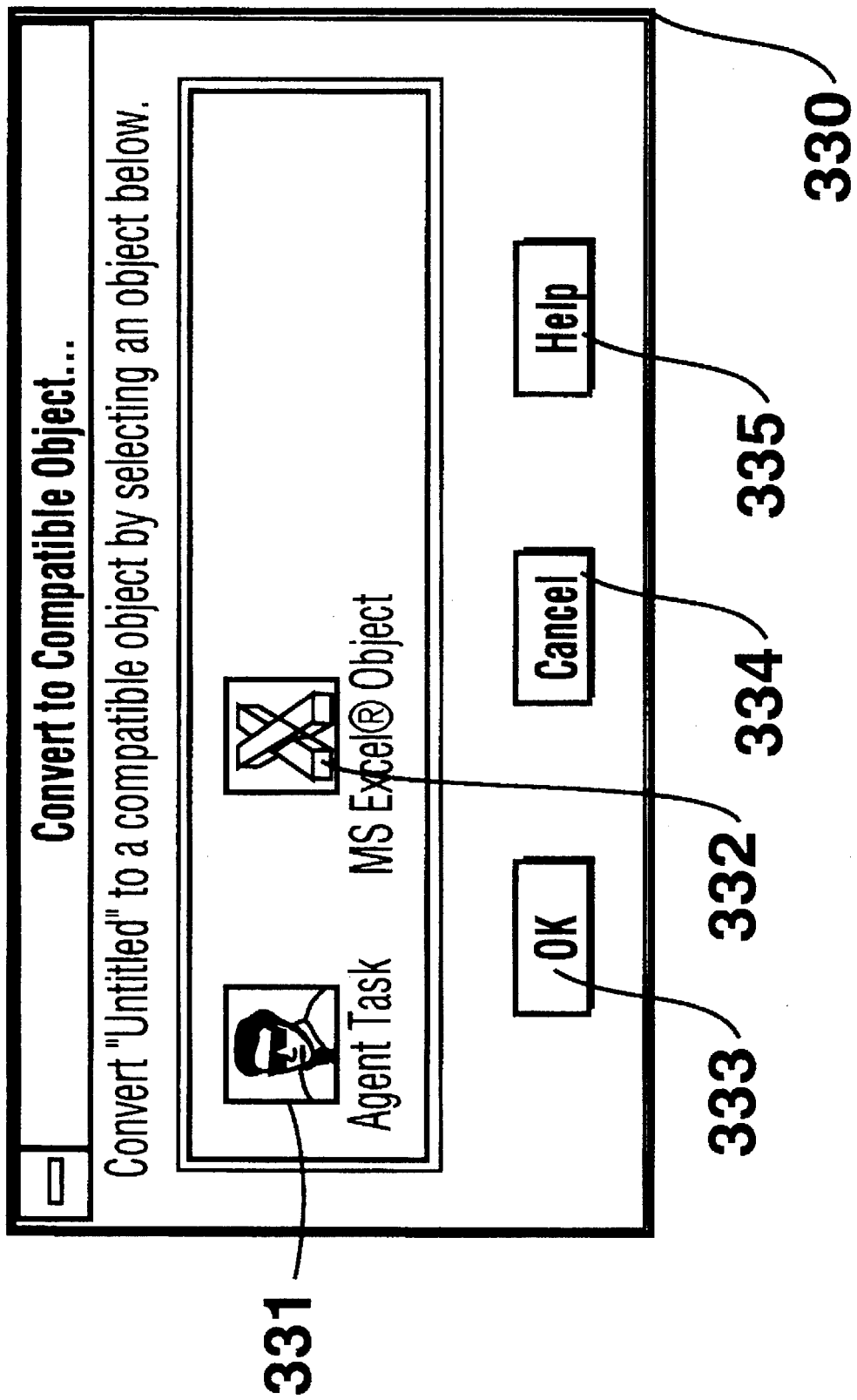

FIG. 14 shows a resulting dialog box 330 which is displayed by monitor 14. Two class objects, represented by icon 331 and icon 332, are displayed in dialog box 330. The number of class objects displayed will be dependent upon the number of classes which are available for the selected object for conversion. No class object is selected when the box is first displayed. An OK button 333 will be greyed until an icon is selected. The user is to select an icon for one of the class objects, at which time OK button 333 will be ungreyed. Multiple selection of icons is disabled. Dialog box 330 is closed when the user uses cursor 310 and mouse 20 to select OK button 333 or a Cancel button 334. OK button 333 is the default push-button. The order of selection when using the Tab key on keyboard 19 is OK button 333, Cancel button 334 and a Help button 335.

In the present example, the user selects icon 331 for class "Agent Task" and then OK button 333. Dialog box 330 closes. An untitled object with class "Agent Task" is created with the data of the Text object represented by icon 309.

Figure 15:
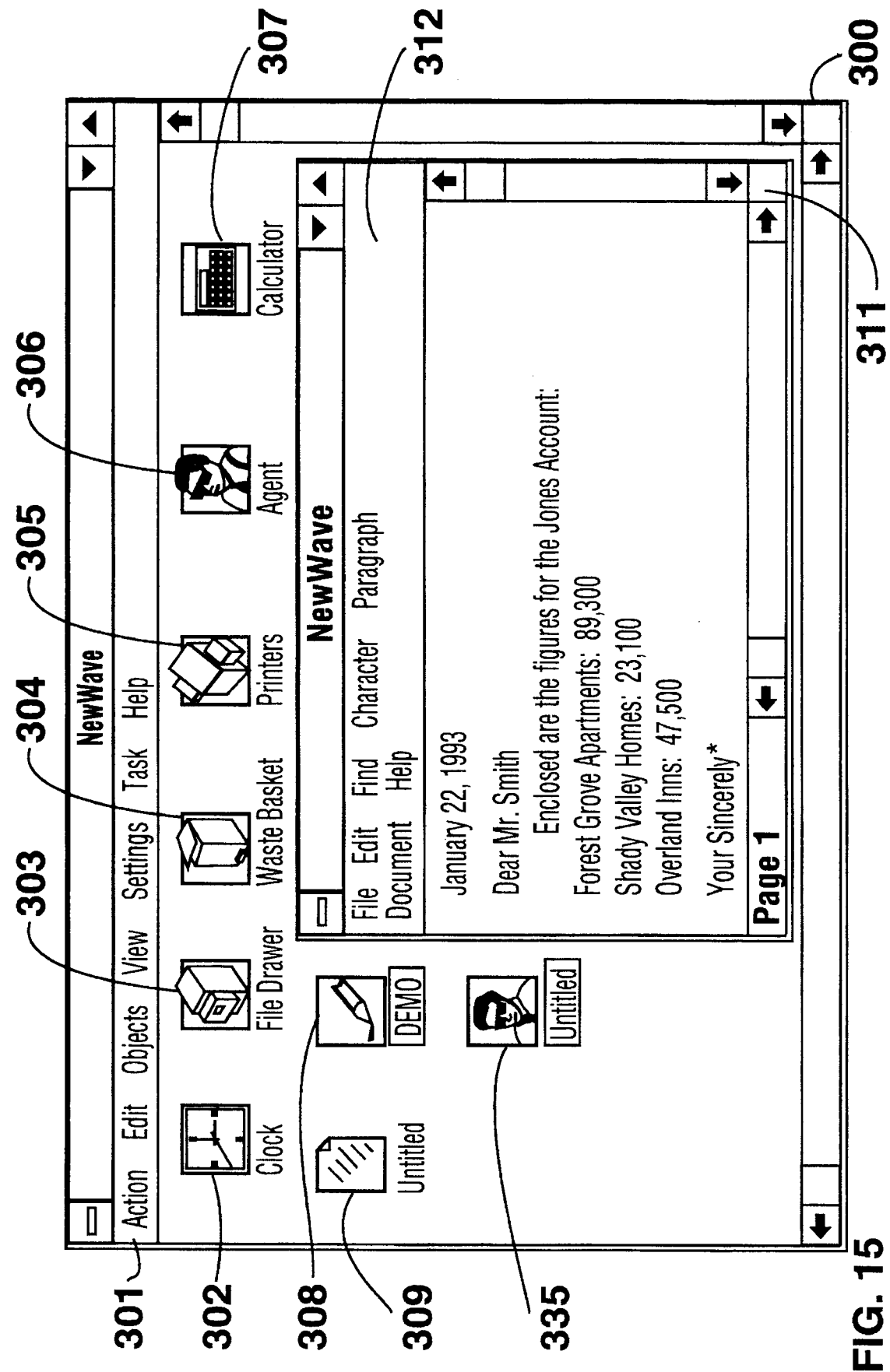

FIG. 15 shows an icon 335 for the new object displayed on the Desktop. Icon 335 has the same title as icon 309, since icon 309 represents the object from which the new object was converted.

Figure 16:
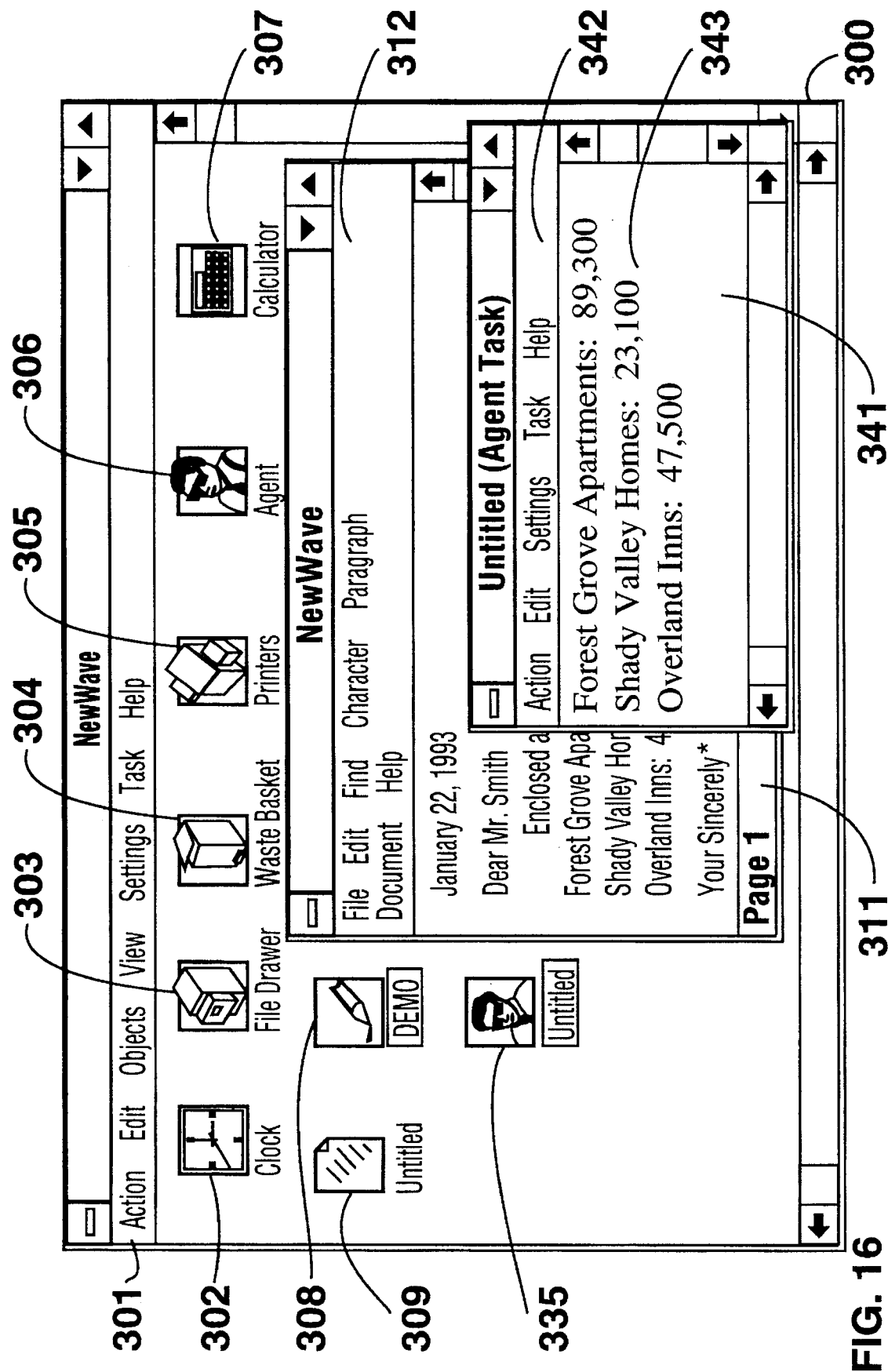

The converted object may be opened, for example, by using mouse 20 to place cursor 310 over icon 335, and depressing a button on mouse 20 twice in quick succession. FIG. 16 shows an open window 341 for the converted object. Window 341 includes a menu bar 342. Within 341, text 343 appears. Text 343 is identical to text 325.

The preferred embodiment of the present invention implements data conversion capabilities in an object management system. Below follows a description of both object conversion and data conversion, a summary of the new properties and methods required for the data conversion, and definitions of the properties and methods. Providing the new properties and supporting the new methods allows an application to take advantage of object conversion, and allows access to an application's data conversion capabilities.

Object conversion, (also called compatible classes) is the reassignment or rebinding of one object's data to another object of a similar class. The information provided in the new properties described below allows the determination of which classes are similar or compatible. In the preferred embodiment there are three situations where there is a need for object conversion: deserialization, deinstallation and creating object from data on clipboard.

There are many ways for a system to receive a serialized object. A problem occurs when the object is deserialized and the originating class is not available on the system. In the preferred embodiment of the present invention, an uninstalled object is created. An example of this would be mailing a serialized encapsulated object to a user who does not have a copy of the originating application. Upon deserialization an uninstalled object would be created. Compatible classes provides the user with a choice to rebind the data from that object to a similar class object, allowing the user to continue to work with that data. So in our example, when the user selects the uninstalled object and chooses the "convert to compatible object" command, he will be presented with any compatible objects on his system to reassign the object data to.

Generally, when an application is de-installed, objects of that class are changed to uninstalled objects. Compatible classes provides a user with choices of reassignment of the uninstalled object's data to another object class, when possible.

Further, as discussed above, when data has been placed on the clipboard and the destination object can only accept an object, the clipboard code needs to search for an object that can accept the given data type and create an object from it. The compatible class information allows the clipboard to potentially find an object that can produce the object the destination requires.

Data conversion is the capability of converting data from one data format to another data format. In the preferred embodiment of the present invention, data conversion has been enhanced to be more general purpose and more robust, with new properties and methods. There is an interrelationship with object conversion since data conversion may be utilized to facilitate an object conversion.

The enhancements according to the present invention are added to an application by adding certain new properties to an install file (IN$ file) for the application, and implementing new methods within the application. These changes allow the application to take advantage of object conversion within the OMF and allow access to any data conversion capabilities already within the application.

Object conversion according to the preferred embodiment of the present invention utilizes the two properties PROP_OBJ_DATA_FMT and PROP_CLASS_DATA_FMT. Other properties, PROP_ACCEPT_DATA_FMTS and PROP_RENDER_DATA_FMTS, are applicable when an application can programmatically input data, can output data, and/or can function as a converter tool. The required properties and any additional properties need to be added to the IN$ file for the application.

PROP_OBJ_DATA_FMT specifies the native data file format for an application (e.g., ASCII), any subformat information, any required data file extension (e.g., .DOC) and any user displayable format specification. This is a required object property that each application provides. This information is used by compatible class code to find out the data format of an object.

PROP_CLASS_DATA_FMT specifies the native data file format for an application (e.g., ASCII), any subformat information, any required data file extension (e.g., .DOC) and any user displayable format specification. This is a required class property that all applications provide. This information is used by the compatible class code to search the system for another class that can understand a given data file format.

In most cases, the file format specified in PROP_OBJ_DATA_FMT will be the same as what is specified in PROP_CLASS_DATA_FMT. Even so, both properties are provided because they are used for different purposes.

PROP_ACCEPT_DATA_FMTS specifies any data file formats that an application is able to input. This includes the format specified in PROP_OBJ_DATA_FMT and PROP_CLASS_DATA_FMT for a given object class. This property is defined only if an application is indeed capable of inputting a format other than the native data file format for the application. If so, the application also implements the ACCEPT_DATA method, described below, as the way for the application to accept the specified data.

PROP_RENDER_DATA_FMTS specifies the data file formats that an application is able to output (any formats the application can convert its data to). This property should be defined only if the application is indeed capable of outputting a format other than the native data file format for the application. If so, the application also implements the RENDER_DATA method, described below, as the way for the application to render the specified data.

An application according to the preferred embodiment implements one or more of the below described methods: ACCEPT_DATA, RENDER_DATA, and CONVERT_DATA.

ACCEPT_DATA is a method that tells an object to accept or input the specified data (which is in a particular file format). It has both a merge and replace capability. It can also be used to create a new object with a particular set of data. To allow the compatible class code (and others) to access information on what file formats an application can accept via the ACCEPT_DATA method, PROP_ACCEPT_DATA_FMTS must be a defined property.

RENDER_DATA is a method that tells an object to render or output its data in a specified format. To allow the compatible class code (and others) to access information on what file formats an application can output via the RENDER_DATA method, PROP_RENDER_DATA_FMTS must be a defined property.

CONVERT_DATA is a method that tells an object to input the specified data file format, convert it to a different format, and render that new data file format. The object is functioning as a converter tool. To allow the compatible class code (and others) to access information on what conversions an application supports via the CONVERT_DATA method, both PROP_ACCEPT_DATA_FMTS and PROP_RENDER_DATA_FMTS must be defined properties.

Two sample IN$ files are provided to demonstrate how the new properties can be entered. These are not complete IN$ files. The first IN$ file is set out in Table 17 below and demonstrates the properties for a simple class that has only one native data file format of ansi text, and has no data conversion capabilities.

TABLE 17

OTHER CLASS PROPERTIES
    PROP_CLASS_DATA_FMT ;Native data format for this class is ansi
        "TEXT,, TXT, \"Ansi\""
END PROPERTIES
OBJECT PROPERTIES
    PROP_OBJ_DATA_FMT ;Current data format for this object is ansi
        "TEST ,, TXT, \"Ansi\""
END PROPERTIES A second IN$ file is shown in Table 18 below and demonstrates the properties for a class that (1) can have BIFF or WK1 as its native data format, (2) can input (via ACCEPT_DATA) BIFF, WK1 or CSV formats, (3) can output (via RENDER_DATA) BIFF or CSV formats, and (4) has BIFF as the current native data format of this object.

TABLE 18

OTHER CLASS PROPERTIES
    PROP_CLASS_DATA_FMT
        "BIFF,, BIF, \"SuperSpreadsheet\";\
        WK1,,, \"Lotus 2.0\""
    PROP_ACCEPT_DATA_FMTS
        "BIFF,, BIF, \"SuperSpreadsheet\";\
        WK1,,, \"Lotus 2.0\";\
        CSV,,, \"Comma Separated Variable (CSV)\""
    PROP_RENDER_DATA_FMTS
        "BIFF,, BIF, \"SuperSpreadsheet\";\
        CSV,,, \"Comma Separated Variable (CSV)\""
END PROPERTIES
OBJECT PROPERTIES
    PROP_OBJ_DATA_FMT
        "BIFF,, BIF, \"SuperSpreadsheet\""
END PROPERTIES PROP_OBJ_DATA_FMT specifies an object's native data file format, any subformat information, any required file extension, and any user displayable string for the format type. This information can be used to determine the data file format of an object so it should always reflect the current format of the object's data. This property is a required property for all data objects.

The format for PROP_OBJ_DATA_FMT is as given below:

"<file format>, {subformat}, {file extension}, {"user displayable string"}"

"File format" is a required uppercased string defining the native data file format for the object. "Subformat" is an optional uppercased string defining any subformat information. Versioning information would be an example subformat. "File extension" is an optional uppercased string of up to 3 characters, defining the file extension for the native data file (no leading period). "User displayable string" is an optional localized quoted string that may be displayed to the user to identify the data file format. The user displayable string must be a quoted string using C language conventions since it occurs within a string. An application should use the file format string for displaying the file format to the user if no user displayable string was provided.

In most cases there will be only one native data file format for an object. Multiple native formats can be specified, but the most important data file format is listed first.

The property PROP_OBJ_DATA_FMT is a quoted string, containing one or more data file format entries. Each entry consists of multiple parameters which must be separated by commas. Multiple entries must be separated by semicolons. Some of the parameters in the format entry are optional and their absence is indicated by ",," (comma comma). Blanks are ignored. A backslash ("\") as the last non-blank character on a line serves as a continuation character.

Table 19 below gives an example of how the property PROP_OBJ_DATA_FMT can be entered in an install file as a single data file info entry.

TABLE 19

PROP_OBJ_DATA_FMT
    "TEST,, TXT, \"Ansi\"⇒

The class property PROP_CLASS_DATA_FMT specifies native data file format(s), any subformat information, any required file extension, and any user displayable string for the format type for a class. This information can be used to determine what class is compatible with a given data file format. This property is specified for a class.

The format for PROP_CLASS_DATA_FMT is as given below:

"<file format>, {subformat}, {file extension}, {"user displayable string"}"

"File format" is a required uppercased string defining the native data file format for the object. "subformat" is an optional uppercased string defining any subformat information. Versioning information would be an example subformat. "File extension" is an optional uppercased string of up to 3 characters, defining the file extension for the native data file (no leading period). "User displayable string" is an optional localized quoted string that may be displayed to the user to identify the data file format. The user displayable string must be a quoted string using C language conventions since it occurs within a string. An application should use the file format string for displaying the file format to the user if no user displayable string was provided.

In most cases there will be only one native data file format for a class. Multiple native formats can be specified if needed. For example, if an application/class was capable of different native formats they would all be listed in this property. PROP_OBJ_DATA_FMT would specify the current native data format for an object of this class.

The property PROP_CLASS_DATA_FMT is a quoted string, containing one or more data file format entries. Each entry consists of multiple parameters which must be separated by commas. Multiple entries must be separated by semicolons. Some of the parameters in a format entry are optional and their absence is indicated by ",," (comma comma). Blanks are ignored. A backslash ("\") as the last non-blank character on a line serves as a continuation character.

Table 20 below gives two examples of how the property PROP_CLASS_DATA_FMT could be entered in an install file:

TABLE 20

A single data file format entry:
PROP_CLASS_DATA_FMT
"TEST,, \"Ansi\""
Two entries, where the first entry has no user displayable string and the second entry has no subformat:
PROP_CLASS_DATA_FMT
"TIFF, V4.0, TIF,, ; \
BITMAP,, BMP, \"BitMap Editor\""

The class property PROP_ACCEPT_DATA_FMTS specifies the data formats that the object is able to input via the ACCEPT_DATA method. This information is used for compatible classes and for conversion needs. The formats should be listed in order of preference, which is likely to be the richest format first.

The format for PROP_ACCEPT_DATA_FMTS is as given below:

"<file format>, {subformat}, {file extension}, {"user displayable string"}"

"File format" is a required uppercased string defining the native data file format for the object. "Subformat" is an optional uppercased string defining any subformat information. Versioning information would be an example subformat. "File extension" is an optional uppercased string of up to 3 characters, defining the file extension for the native data file (no leading period). User displayable string is an optional localized quoted string that may be displayed to the user to identify the data file format. The user displayable string must be a quoted string using C language conventions since it occurs within a string. An application should use the file format string for displaying the file format to the user if no user displayable string was provided.

File format(s) specified for PROP_OBJ_DATA_FMT and PROP_CLASS_DATA_FMT should be included in the list for property PROP_ACCEPT_DATA_FMTS if the application can input these native formats. Any other formats an application can input should be listed also. The format string may be as listed below or from an application's own proprietary format string.

The property PROP_ACCEPT_DATA_FMTS is a quoted string, containing one or more data file format entries. Each entry consists of multiple parameters which must be separated by commas. Multiple entries must be separated by semicolons. Some of the parameters in a format entry are optional and their absence is indicated by ",," (comma comma). Blanks are ignored. A backslash ("\") as the last non-blank character on a line serves as a continuation character.

Table 21 below gives an example of how the property PROP_ACCEPT_DATA_FMTS would be entered in an install file:

TABLE 21

PROP_ACCEPT_DATA_FMTS
"WK1,, WK1, \"Lotus 2.0\"";\
CSV,, CSV,, ;\
BIFF,, BIF, \"Excel\""

The class property PROP_RENDER_DATA_FORMATS specifies the data formats that the object is capable of outputting via the RENDER_DATA method. This information is used for compatible classes and for conversion needs. The formats should be listed in order of preference, which is likely to be the richest format first.

The format for PROP_RENDER_DATA_FMTS is as specified below:

"<file format>, {subformat}, {file extension}, {"user displayable string"}"

"File format" is a required uppercased string defining the native data file format for the object. "Subformat" is an optional uppercased string defining any subformat information. Versioning information would be an example subformat. "File extension" is an optional uppercased string of up to 3 characters, defining the file extension for the native data file (no leading period). "User displayable string" is an optional localized quoted string that may be displayed to the user to identify the data file format. The user displayable string must be a quoted string using C language conventions since it occurs within a string. An application should use the file format string for displaying the file format to the user if no user displayable string was provided.

File format(s) specified for PROP_OBJ_DATA_FMT and PROP_CLASS_DATA_FMT should be included in the list for property PROP_RENDER_DATA_FMTS if the application can output these native formats. Any other formats an application can output should be listed also.

The property PROP_RENDER_DATA_FMTS is a quoted string, containing one or more data file format entries. Each entry consists of multiple parameters which must be separated by commas. Multiple entries must be separated by semicolons. Some of the parameters in a format entry are optional and their absence is indicated by ",," (comma comma). Blanks are ignored. A backslash ("\") as the last non-blank character on a line serves as a continuation character.

Table 22 below gives is an example of how the property PROP_RENDER_DATA_FMTS would be entered in an install file:

TABLE 22

PROP_RENDER_DATA_FMTS
"TEXT,, TXT, \"Ansi\"";\
RDF,, RDF, \"NewWave Write\""

The following discusses the three methods, ACCEPT_DATA, RENDER_DATA, AND CONVERT_DATA. The method "ACCEPT_DATA" is sent to an object for the object to accept the given data from a DOS file, memory or from the clipboard. This is a simpler, more general message than the existing CONVERT method. Table 23 below sets out the structure of the parameters sent as part of the method ACCEPT_DATA.

TABLE 23

| typedef struct { | |
|---|---|
| DATAINFOSTRUCT | DataIn; |
| BOOL | DisplayUserMsg; |
| BOOL | Merge; |
| WORD | Zero; |
| } ACCEPTDATASTRUCT; | |

"DataIn" is a structure that contains information regarding the format and location of the data to input. See the structure definition below. "DisplayUserMsg" should be checked by the object if an error occurs during the processing of this method. If set to TRUE then the object is to display any error messages. If set to FALSE then the object is to return −1, allowing the caller to display a message. "Merge" is set to TRUE if the data is to be merged in, FALSE if the data is to replace the object's current data. "Zero" is reserved for possible future extensions to this method and in the preferred embodiment is set to 0.

Table 24 below sets out the DATAINFOSTRUCT structure that is returned as a result of the method ACCEPT_DATA.

If the data could not be accepted, (for example wrong format, can't read from clipboard, or cannot accept data while window open), then 0 should be returned in the LOWORD of the return value. If there was an error while inputting the data, then −1 should be returned. The DisplayUserMsg parameter should be checked to see if receiver should display an error message. If the object could input the data successfully, then 1 should be returned. The HIWORD of the return value must be zero.

The method "RENDER_DATA" is sent to an object for the to render its data in a specified format. Table 25 below sets out the structure of the parameters sent as part of the method RENDER_DATA.

TABLE 25

| typedefstruct { | |
|---|---|
| DATAINFOSTRUCT | DataOut; |
| BOOL | DisplayUserMsg |
| DEVICEDATASTRUCT | DeviceData; |
| WORD | TestWidth; |
| WORD | Zero; |
| } RENDERDATASTRUCT; | |

"DataOut" is a structure that contains information regarding the format and location of the rendered data. See the structure definition below. "DisplayUserMsg" should be checked by the object if an error occurs during the processing of this method. If set to TRUE then the object is to display any error messages. If set to FALSE then the object

TABLE 24

| typedefstruct { | |
|---|---|
| WORD | Location; |
| char | Format[MAXFORMATNAMELENGTH]; |
| char | SubFormat[MAXFORMATNAMELENGTHj; |
| char | FileName[MAXROOTFILENAMELENGTH]; |
| HANDLE | hMemory; |
| } DATAINFOSTRUCT; | |
| Location - where the data can be read from. | |
| #define DI_FILE | 0 × 0000 |
| #define DI_MEMORY | 0 × 0001 |
| #define DI_CLIPBOARD | 0 × 0002 |

"Format" is the data file format. This may be a string from the list of predefined NewWave format strings or the application's own proprietary format string. "SubFormat" is not required but may be set to further define the format. Examples of subformat information could be versioning information for a format, or more specific format information. "FileName" is the filename which must be provided if DI_FILE is set in the Location parameter. This parameter is ignored if Location is set to DI_MEMORY or DI_CLIPBOARD. "hMemory" should contain a global handle to the requested data if Location parameter is set to DI_MEMORY. This handle is allocated by the sender using GMEM_LOWER. The maximum buffer size in bytes of the buffer associated with the global handle is MAXVIEWDATABUFFERSIZE.

is to return −1, allowing the caller to display a message. "DeviceData" allows specification of the destination device which is needed for metafiles. See the structure definition below. "TextWidth" allows specification of how wide text should be. Used for MPE destinations which require 80 char text widths. Set to 0XFFFF if not applicable, as when text width restrictions do not apply. "Zero" is reserved for possible fixture extensions to this method and in the preferred embodiment is set to 0.

Table 26 below sets out the DATAINFOSTRUCT structure that is returned as a result of the method RENDER_DATA.

TABLE 26

| typedefstruct { | |
|---|---|
| WORD | Location; |
| char | Format[MAXFORMATNAMELENGTH]; |
| char | SubFormat[MAXFORMATNAMELENGTH]; |
| char | FileName[MAXROOTFILENAMELENGTH]; |
| HANDLE | hMemory; |
| } DATAINFOSTRUCT; | |
| Location - where the data can be read from. | |

TABLE 26-continued

```
#define DI_FILE         0 × 0000
#define DI_MEMORY       0 × 0001
#define DI_CLIPBOARD    0 × 0002
```

"Format" is the data file format. This may be a string from the list of predefined NewWave format strings or the application's own proprietary format string. To have the object render the data in its own format make this parameter NULL. "SubFormat" is not required but may be set to further define the format. Examples of subformat information could be versioning information for a format, or more specific format information. FileName is the file name which must be provided if DI_FILE is set in the Location parameter. This parameter is ignored if Location is set to DI_MEMORY or DI_CLIPBOARD. "hMemory" should contain a global handle to the requested data if Location parameter is set to DI_MEMORY. This handle is allocated by the receiver using GMEM_LOWER. The maximum buffer size in bytes of the buffer associated with the global handle is MAXVIEWDATABUFFERSIZE. The handle should be freed by the sender after it has examined the return information. If the data cannot fit in the maximum buffer size, an error should be returned.

The device data structure "DEVICEDATASTRUCT" for the method is set out in Table 27 below:

TABLE 27

```
type struct {
  char DeviceName[MAX_DEVNAME + 1];
  char DriverName[MAX_DRIVERNAME + 1];
  char PortName[MAX_PORTNAME + 1];
} DEVICEDATASTRUCT;
```

TABLE 28

```
typedefstruct {
  DATAINFOSTRUCT      DataIn;
  DATAINFOSTRUCT      DataOut;
  BOOL                DisplayUserMsg;
  DEVICEDATSTRUCT     DeviceData;
  WORD                TextWidth;
  WORD                Zero;
} CONVERTDATASTRUCT;
```

"DataIn" contains data information for data coming into this object. See the structure definition below. "DataOut" contains data information for data to be rendered by this object. See the structure definition below. "DisplayUserMsg" should be checked by the object if an error occurs during the processing of this method. If set to TRUE then the object is to display any error messages. If set to FALSE then the object is to return −1, allowing the caller to display a message. "DeviceData" allows specification of the destination device which is needed for metafiles. "TextWidth" allows specification of how wide text should be. It is used for MPE destinations which require 80 char text widths. Set to 0XFFFF if not applicable, as when text width restrictions do not apply. "Zero" is reserved for possible future extensions to this method and in the preferred embodiment is set to 0.

Table 29 below sets out the DATAINFOSTRUCT structure that is returned as a result of the method CONVERT_DATA.

TABLE 29

```
typedefstruct {
  WORD        Location;
  char        Format[MAXFORMATNAMELENGTH];
  char        SubFormat[MAXFORMATNAMELENGTH];
  char        FileName[MAXROOTFILENAMELENGTH];
  HANDLE      hMemory;
} DATAINFOSTRUCT;
Location - where the data can be read from.
when accepting data or where the data
should be placed when rendering data.
#define DI_FILE         0 × 0000
#define DI_MEMORY       0 × 0001
#define DI_CLIPBOARD    0 × 0002
```

If the data could not be rendered (for example, cannot render data while window open) then 0 should be returned in the LOWORD of the return value. If there was an error while outputting the data, then −1 should be returned. The DisplayUserMsg parameter should be checked to see if receiver should display an error message. If the object could output the data successfully, then 1 should be returned. The HIWORD of the return value must be zero.

The method CONVERT_DATA is sent to an object for the object to input the given data, convert it to the specified format, and output the newly formatted data. This method is by an object that can function as a converter. Table 28 below sets out the structure of the parameters sent as part of the method CONVERT_DATA.

"Format" is the data file format. This may be a string from the list of predefined NewWave format strings or the application's own proprietary format string. To have the object render the data in its own format make this parameter NULL. "SubFormat" is not required but may be set to further define the format. Examples of subformat information could be versioning information for a format, or more specific format information. "FileName" is the filename which must be provided here if DI_FILE is set in the Location parameter. This parameter is ignored if Location is set to DI_MEMORY or DI_CLIPBOARD. "hMemory" should contain a global handle to the requested data if Location parameter is set to DI_MEMORY. This handle is allocated by the receiver using GMEM_LOWER. The handle should be freed by the sender after it has examined the return information. If the data cannot fit in the maximum buffer size, an error should be returned.

If the conversion is not supported (for example, cannot convert if window open) then 0 should be returned in the LOWORD of the return value. If there was an error during conversion, then −1 should be returned. The DisplayUserMsg parameter should be checked to see if receiver should display an error message. If conversion was successful, then 1 should be returned. The HIWORD of the return value must be zero.

Figure 17:
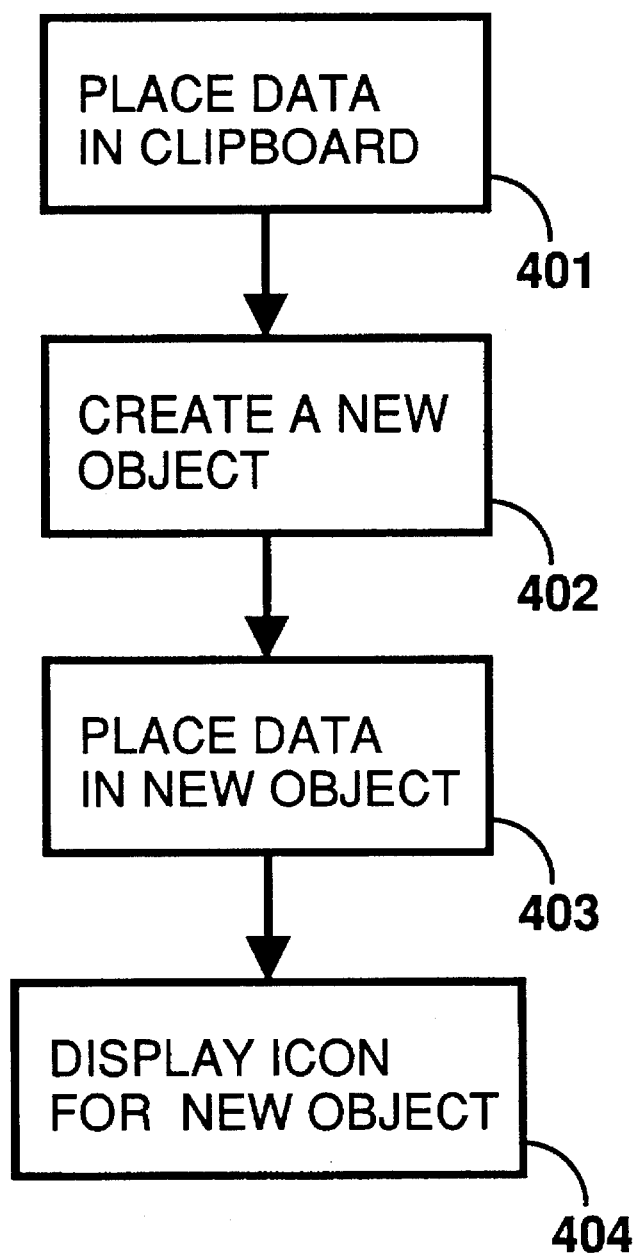
FIG. 17 is a flowchart for a computer implemented method within an object management facility in accordance with a preferred embodiment of the present invention.

FIG. 17 is a flowchart which summarizes a computer implemented method within an object management facility. In a step 401, the data is placed in the clipboard, for example, in response to a Cut command or in response to a Copy command from an application process originally processing the data. In response to a user pasting data within a clipboard to a desktop for the object management facility, in a step 402, a new object for the data is created. When the data is text, the new object is created to be of a type which contains text. When the data is bitmap, the new object is created to be of a type which contains bitmaps. In a step 403, the data is placed within the new object. In a step 404, an icon is displayed on the desktop for the new object. The data can be reformatted, for example, before exporting the data from the application process, before importing the data to the new object or after importing the data to the new object.

Figure 18:
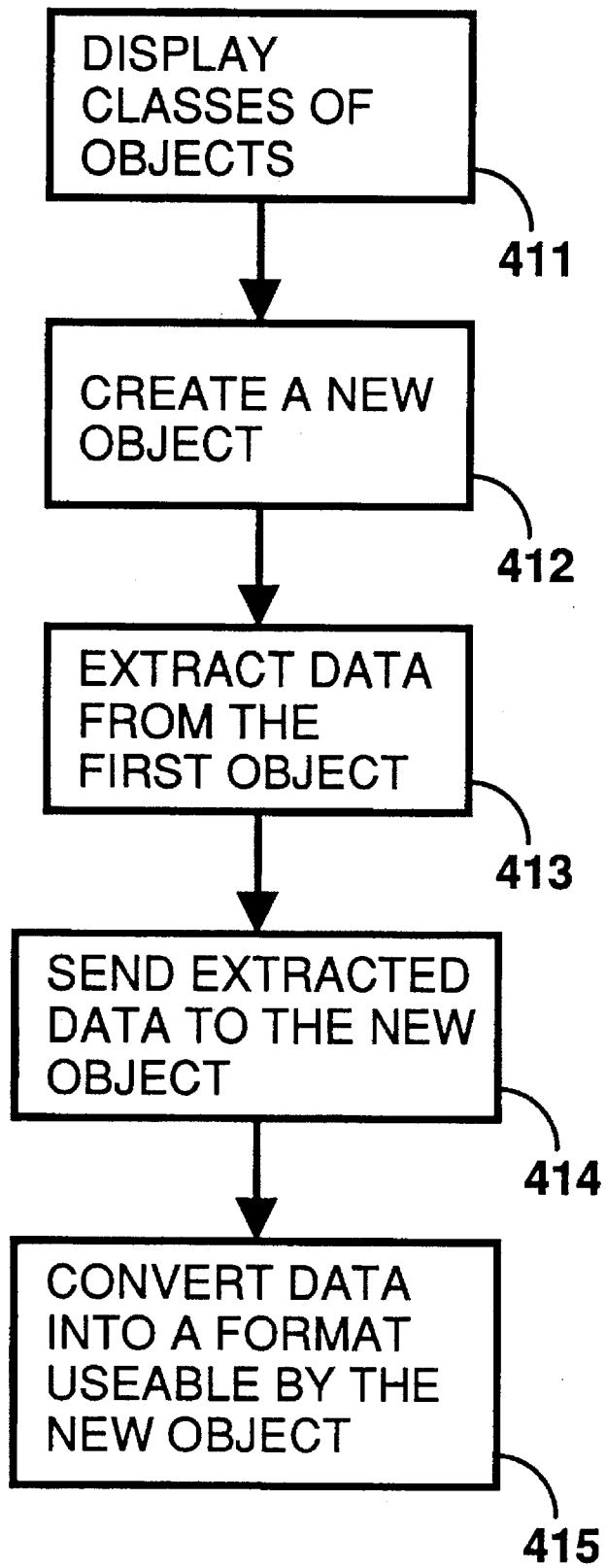
FIG. 18 is a flowchart for a computer implemented method within an object management facility in accordance with another preferred embodiment of the present invention.

FIG. 18 is a flowchart which summarizes another computer implemented method within an object management facility. In response to a user selecting a first object and issuing a conversion command, in a step 411, classes of objects into which the first object may be converted are displayed to the user. Upon the user selecting a class of objects into which the first object is to be converting, the first object is converted into a new object of the selected class of objects, as follows. In a step 412, a new object is created. In a step 413, data from the first object is extracted. In a step 414, the extracted data is sent to the new object. In a step 415, the data is converted to a format usable by the new object. The conversion may be performed by the new object, by the first object or by the object management facility.

The foregoing discussion discloses and describes merely exemplary methods and embodiments of the present invention. As will be understood by those familiar with the art, the invention may be embodied in other specific forms without departing from the spirit or essential characteristics thereof. Accordingly, the disclosure of the present invention is intended to be illustrative, but not limiting, of the scope of the invention, which is set forth in the following claims.

We claim:

1. A computer implemented method within an object management facility comprising the step of:
   (a) in response to a user pasting data within a clipboard to a window controlled by the object management facility, performing the following substeps:
      (a.1) creating, by the object management facility, a new object for the data;
      (a.2) placing the data within the new object; and,
      (a.3) displaying by the object management facility, an icon for the new object.

2. A computer implemented method as in claim 1 wherein substep (a.1) includes the following substeps:
   when the data is text, creating the new object to be of a type which contains text; and,
   when the data is other than text, searching for a class of object that can accept the data.

3. A computer implemented method as in claim 1 additionally comprising the following step executed before step (a):
   (b) placing the data in the clipboard in response to a Cut command from an application process.

4. A computer implemented method as in claim 3 wherein step (b) includes reformatting the data before exporting the data from the application process.

5. A computer implemented method as in claim 1 additionally comprising the following step executed before step (a):
   (b) placing the data in the clipboard in response to a Copy command from an application process.

6. A computer implemented method as in claim 5 wherein step (b) includes reformatting the data before exporting the data from the application process.

7. A computer implemented method as in claim 1, wherein substep (a.2) includes:
   importing the data into the new object using a method by which the new object changes the format of the data.

8. A computer implemented method within an object management facility comprising the steps of:
   (a) in response to a user selecting a paste command while a desktop for the object management facility is active, performing the following substeps:
      (a.1) if there is no data on a clipboard, doing nothing;
      (a.2) if an object format for data on the clipboard cannot be provided, doing nothing;
      (a.3) if there is data ion the clipboard and an object format for data can be provided, performing the following substeps:
         (a.3.1) creating, by the object management facility, a new object for the data;
         (a.3.2) placing the data within the new object; and,
         (a.3.3) displaying an icon on the desktop for the new object.

9. A computer implemented method as in claim 8 wherein substep (a.3.2) includes:
   importing the data into the new object using a method by which the new object changes the format of the data.

10. A computer implemented method within an object management facility comprising the step of:
    (a) in response to a user selecting a first object and issuing a conversion command, performing the following substeps:
       (a.1) displaying, to the user, classes of objects into which the first object may be converted; and,
       (a.2) upon the user selecting a class of objects into which the first object is to be converted, converting the first object into a new object of the selected class of objects.

11. A computer implemented method as in claim 10 wherein step (a.2) includes the following substeps:
    (a.2.1) creating, by the object management facility, the new object;
    (a.2.2) extracting data from the first object;
    (a.2.3) sending the data extracted in substep (a.2.2) to the new object; and,
    (a.2.4) converting, by the new object, the data into a format usable by the new object.

12. A computer implemented method as in claim 11 wherein the converting in substep (a.2.4) is performed using an ACCEPT_DATA method.

13. A computer implemented method as in claim 10 wherein step (a.2) includes the following substeps:
    (a.2.1) creating, by the object management facility, the new object;
    (a.2.2) converting, by the first object, data within the first object into converted data with a format usable by the new object;

(a.2.3) extracting the converted data from the first object; and, (a.2.4) sending the converted data to the new object.

14. A computer implemented method as in claim 13 wherein the converting in substep (a.2.2) is performed using a RENDER_DATA method.

15. A computer implemented method as in claim 10 wherein step (a.2) includes the following substeps:

(a.2.1) creating, by the object management facility, the new object;

(a.2.2) extracting the converted data from the first object;

(a.2.3) converting, by the object management facility, the data extracted in step (a.2.2) into converted data with a format usable by the new object; and, (a.2.4) sending the converted data to the new object.

16. A computer implemented method as in claim 15 wherein the converting in substep (a.2.3) is performed using a CONVERT_DATA method.

17. A computer implemented method within an operating system process comprising the step of:

(a) in response to a user selecting data from a file and designating a window controlled by the operating system process in which to place the data, performing the following substeps:

(a.1) creating, by the operating system process, a new data file for the data;

(a.2) placing the data within the new data file; and, (a.3) displaying, by the operating system process, an icon for the new data file appearing within the window.

18. A computer implemented method as in claim 17 wherein substep (a.2) includes:

importing the data into the new data file using a method by which the new data file changes the format of the data.

\* \* \* \* \*